United States Patent [19]

Shirakihara

[11] Patent Number: 5,553,241
[45] Date of Patent: Sep. 3, 1996

[54] CONNECTION-ORIENTED COMMUNICATION SYSTEM WITH COMMUNICATION PATH RE-ESTABLISHMENT MECHANISM

[75] Inventor: Toshio Shirakihara, Kanagawa-ken, Japan

[73] Assignee: Kabushiki Kaisha Toshiba, Kawasaki, Japan

[21] Appl. No.: 113,058

[22] Filed: Aug. 27, 1993

[30] Foreign Application Priority Data

Aug. 28, 1992 [JP] Japan ..................... 4-229788

[51] Int. Cl.$^6$ .................................. G06F 13/14
[52] U.S. Cl. ............... 395/200.12; 395/858; 370/95.1; 340/825.03; 364/230.06; 364/238; 364/241.9; 364/242.6; 364/242.94; 364/DIG. 1
[58] Field of Search ........................ 395/800, 725, 395/650, 575, 325, 275, 200, 200.12, 200.15, 840, 858, 860, 311, 182.09, 726, 727, 728; 371/8.1, 8.2, 9.1, 11.1, 11.2, 11.3, 67.1, 68.1, 68.2, 68.3; 370/53, 54, 58.2, 58.3, 60, 60.1, 65, 67, 85.7, 91, 94.3, 95.1; 340/825, 825.01, 825.02, 825.03, 826, 827, 825.08

[56] References Cited

U.S. PATENT DOCUMENTS

| | | | |
|---|---|---|---|
| 4,479,195 | 10/1984 | Herr et al. ................ | 395/200.04 |
| 4,706,150 | 11/1987 | Lebizay et al. ........... | 340/825.5 |
| 4,901,231 | 2/1990 | Bishop et al. ............. | 395/325 |
| 4,972,465 | 11/1990 | Cline et al. ................ | 379/279 |
| 5,179,669 | 1/1993 | Peters ........................ | 395/312 |
| 5,191,578 | 3/1993 | Lee ............................ | 370/63 |
| 5,367,698 | 11/1994 | Webber et al. ............ | 395/800 |
| 5,418,909 | 5/1995 | Jackowski et al. ....... | 395/275 |
| 5,423,006 | 6/1995 | Brown et al. ............. | 395/275 |

OTHER PUBLICATIONS

ACM 9th SOSP, 1983, pp. 110–119, M. L. Powell, et al., "Process Migration in DEMOS/MP".

USENIX Winter 92', 1992, pp. 283–290, M. Litzkkow, et al., "Suppporting Checkpointing and Process Migration Outside The Unix Kernel".

*Primary Examiner*—Alpesh M. Shah
*Attorney, Agent, or Firm*—Oblon, Spivak, McClelland, Maier, & Neustadt, P.C.

[57] ABSTRACT

A connection-oriented communication system capable of realizing the communication path re-establishment automatically, without requiring the programming of the procedures for the re-establishment of the communication path in the mutually communicating programs. The system includes: communication unit for providing connection-oriented communication paths: first communication execution unit for making a connection request for requesting a communication port of a connected communication path in the communication unit: communication path establishing unit for creating the connected communication path and returning one communication port of the connected communication path to the first communication execution unit, in response to the connection request made by the first communication execution unit; and second communication execution unit for receiving another communication port of the connected communication path from the communication path establishing unit, such that the first and second communication execution units communicate through that one and another communication ports of the connected communication path.

19 Claims, 24 Drawing Sheets

CONNECTION-ORIENTED COMMUNICATION SYSTEM WITH COMMUNICATION PATH RE-ESTABLISHMENT MECHANISM

BACKGROUND OF THE INVENTION

1. Field of the Invention

The present invention relates to a connection-oriented communication system with a mechanism for re-establishing a communication path (connection) among programs in a distributed system environment.

2. Description of the Background Art

Conventionally, a connection-oriented communication path has been utilized for the sake of achieving the data exchange among the programs at a high reliability.

The communication using such a connection-oriented communication path is usually carried out in the following two steps.

(1) A communication path establishment by a connection of communication ports (2) A data transfer Here, the connection of communication ports is usually carried out asymmetrically by dividing a side for accepting the connection demand (server) and a side for requesting the connection (client). The server creates a communication port and wait for the connection request from the client. On the other hand, the client creates a communication port and makes a connection request to the communication port of the server. When the waiting of the connection request on the server side and the making of the connection request on the client side match with each other, the connection is established. After this connection is established, the data transfer can be carried out by using these connected communication ports. Once established, the connection is maintained until either one of the connected communication ports is closed.

In order to carry out such a connection-oriented communication by the programs, the procedures for the connection establishment are required to be programmed in the programs themselves on both of the server and client sides.

Now, in a program which requires such a connection-oriented communication path for its execution, there are cases in which a necessity arises for interrupting a currently executed processing once and re-starting the communication on another processor. As an example, there is a case in which a program on one processor A which is executing the processing by communicating with another program on another processor B cannot continue its processing on this processor A due to a need for the maintenance operation on this processor A or a malfunction of this processor A, so that the processing must be continued on still another processor C. In this case, there is a need for this program to release the communication path between the processors A and B once, and re-establish a connection with that another program on the processor B again on the processor C. Thus, the programming of the procedures for this re-establishment of a connection is necessary on both of the mutually communicating programs.

On the other hand, in the distributed system, there is a technique for load balancing of the distributed system called a process migration in which a program executed on a certain processor is relocated on another processor by reinstating its execution state.

Now, in order to carry out this process migration for the program using the connection-oriented communication path, there is a need to release the original communication path once and re-establish the communication path at the relocated processor as described above.

Here, in general, the process migration should be carried out without requiring the program to be aware of the occurrence of the migration, but in a case of using the connection-oriented communication path, the procedure for the re-establishment of a connection must be carried out on the program to be migrated as well as on the program communicating with that program to be migrated, so that it has conventionally been difficult to carry out the process migration for the program using a connection-oriented communication path without making the mutually communicating programs aware of the communication path re-establishment occurring in conjunction with the migration.

SUMMARY OF THE INVENTION

It is therefore an object of the present invention to provide a connection-oriented communication system capable of realizing the communication path re-establishment automatically, without requiring the programming of the procedures for the re-establishment of the communication path in the mutually communicating programs.

According to one aspect of the present invention there is provided a connection-oriented communication system, comprising: communication means for providing connection-oriented communication paths; and first communication execution means for making a connection request for requesting a communication port of a connected communication path in the communication means; communication path establishing means for creating the connected communication path and returning one communication port of the connected communication path to the first communication execution means, in response to the connection request made by the first communication execution means; and second communication execution means for receiving another communication port of the connected communication path from the communication path establishing means, such that the first and second communication execution means communication through said one and another communication ports of the connected communication path.

According to another aspect of the present invention there is provided a method of connection-oriented communication, comprising the steps of: (a) making a connection request for requesting a communication port of a connected communication path from a first communication execution means; (b) creating the connected communication path and returning one communication port of the connected communication path to the first communication execution means, at a communication path establishing means, in response to the connection request made by the first communication execution means; (c) receiving another communication port of the connected communication path from the communication path establishing means at a second communication execution means; and (d) executing a communication between the first and second communication execution means through said one and another communication ports of the connected communication path.

Other features and advantages of the present invention will become apparent from the following description taken in conjunction with the accompanying drawings.

FIB. 11 is a schematic block diagram of another modified configuration of a first embodiment of a connection-oriented communication system according to the present invention.

Figure 11:
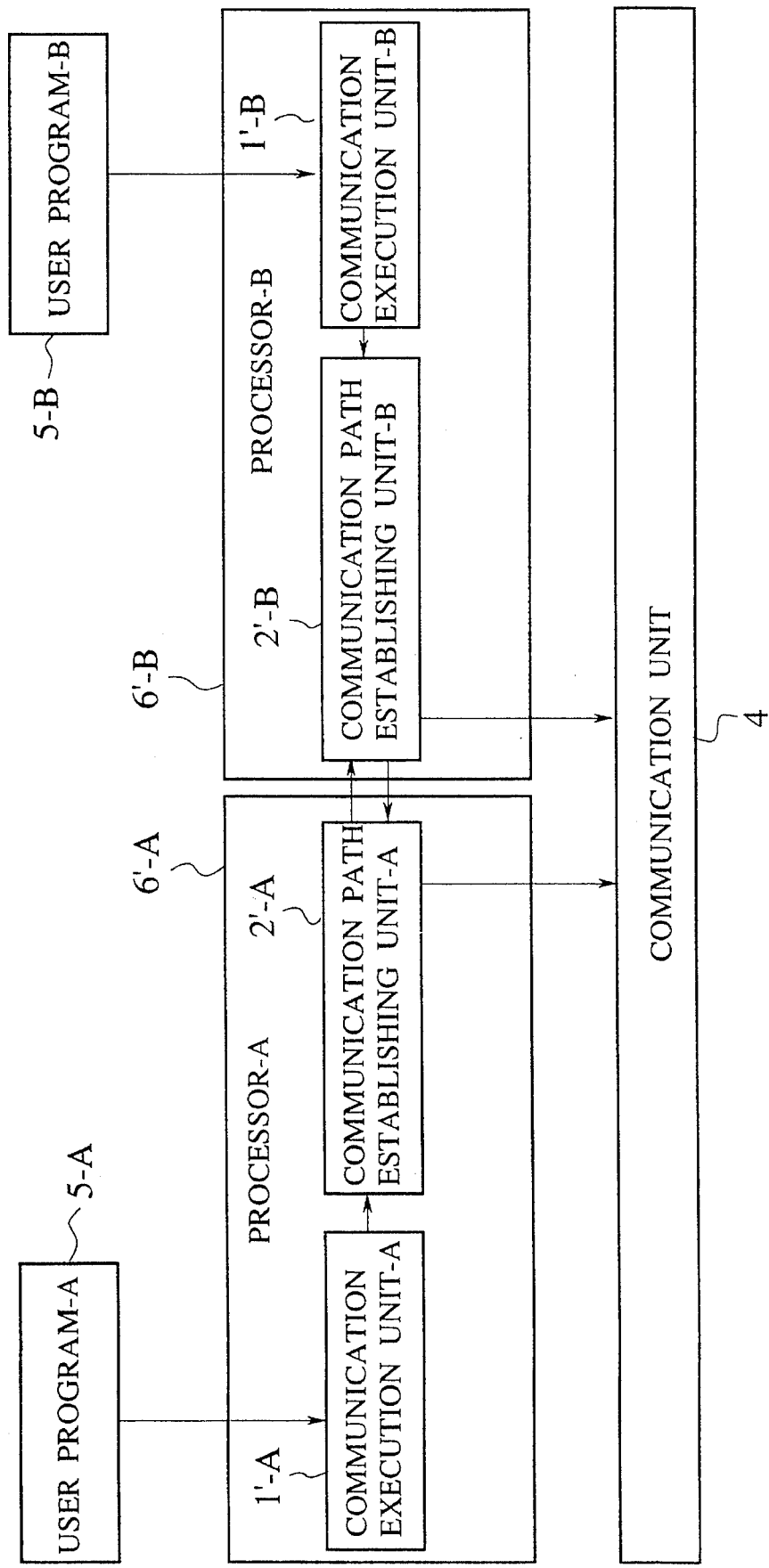
Figure 12:
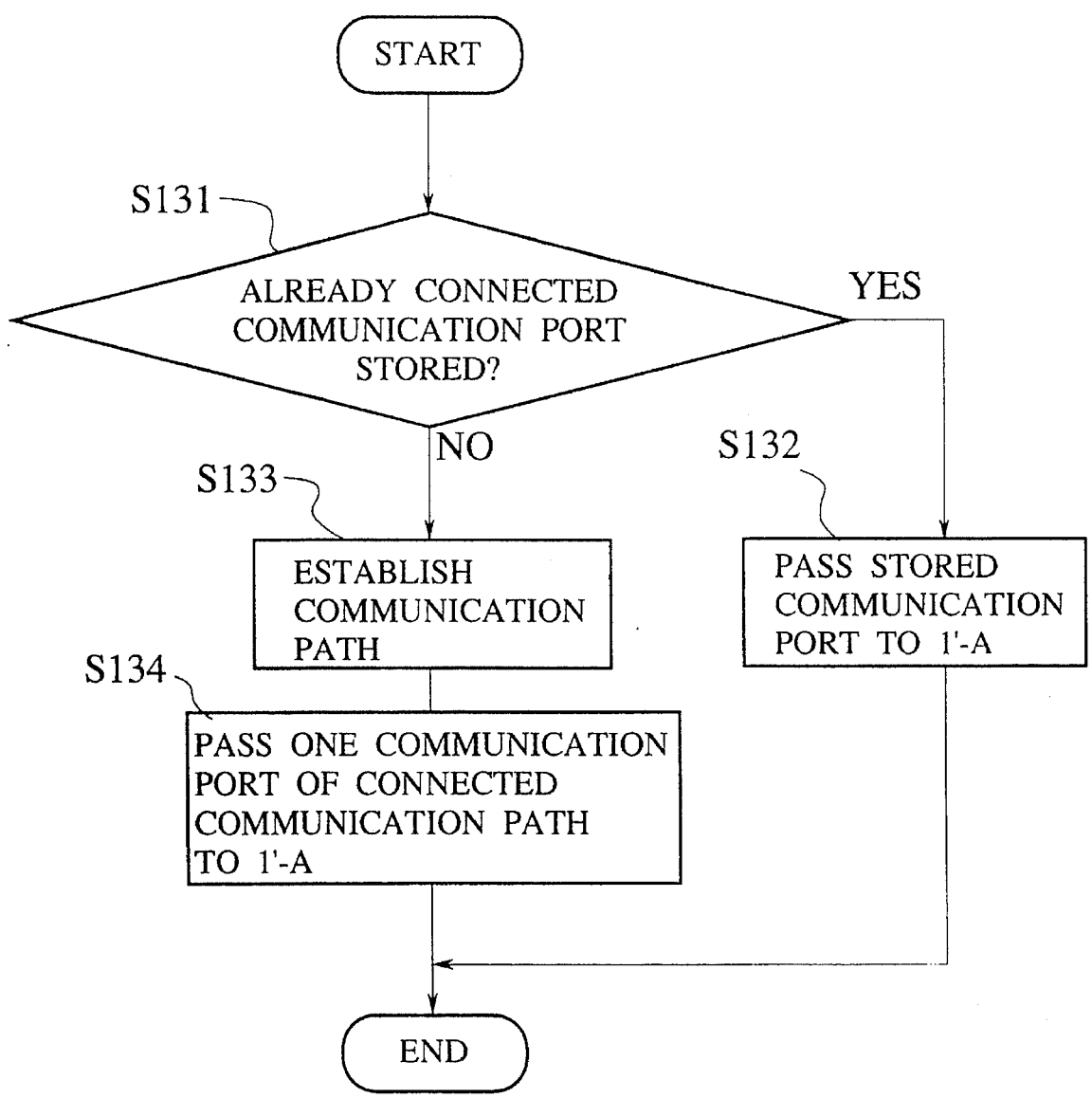

FIG. 12 is a flow chart for the operations of a communication path establishing unit in the system of FIG. 11.

Figure 13:
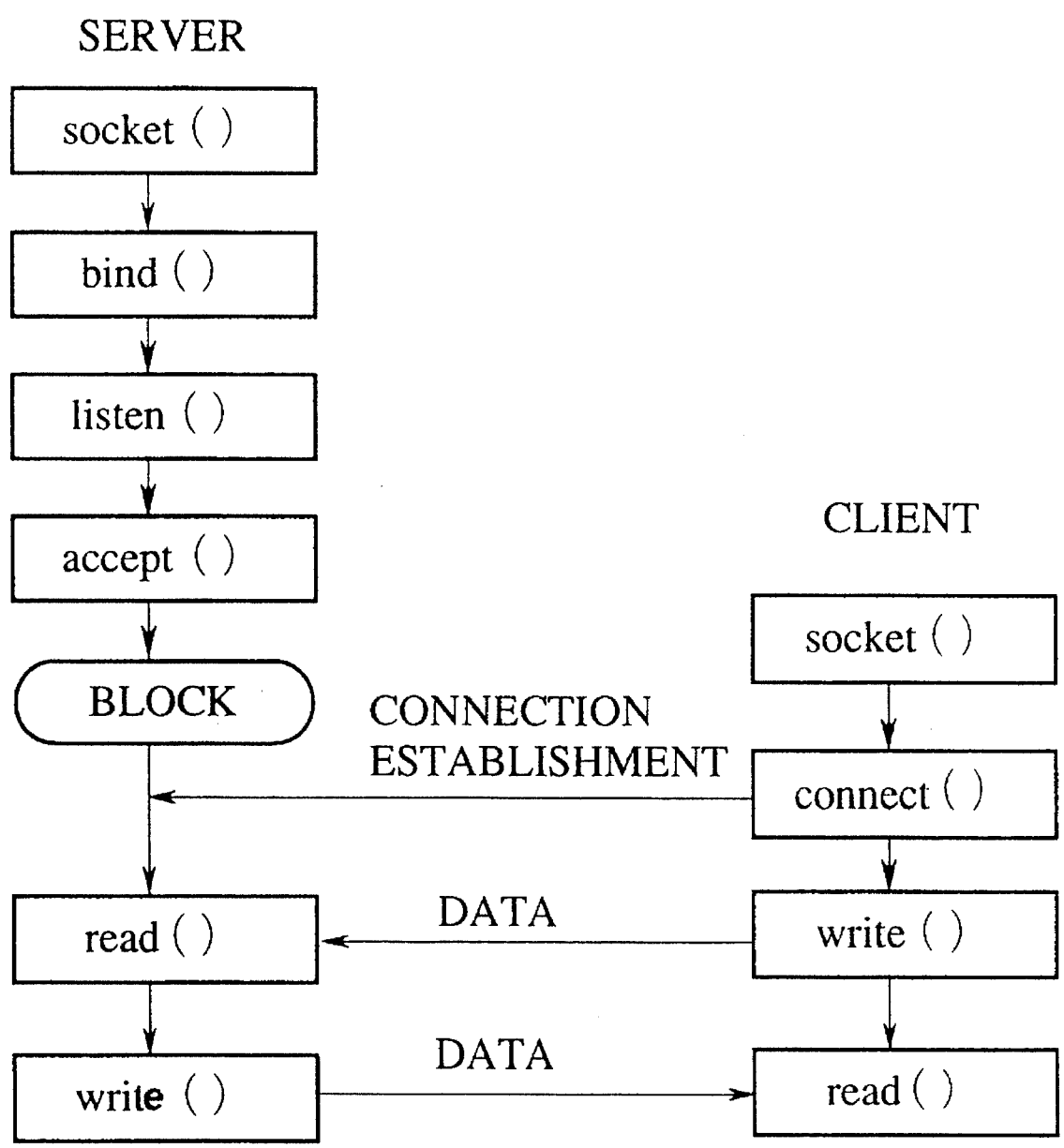

FIG. 13 is a diagram representing a procedure of communication between processes using socket in a system operated by UNIX.

FIGS. 14 to 18 are schematic block diagrams of exemplary configurations of a second embodiment of a connection-oriented communication system according to the present invention at various stages in the process migration on UNIX.

DETAILED DESCRIPTION OF THE PREFERRED EMBODIMENTS

Figure 1:
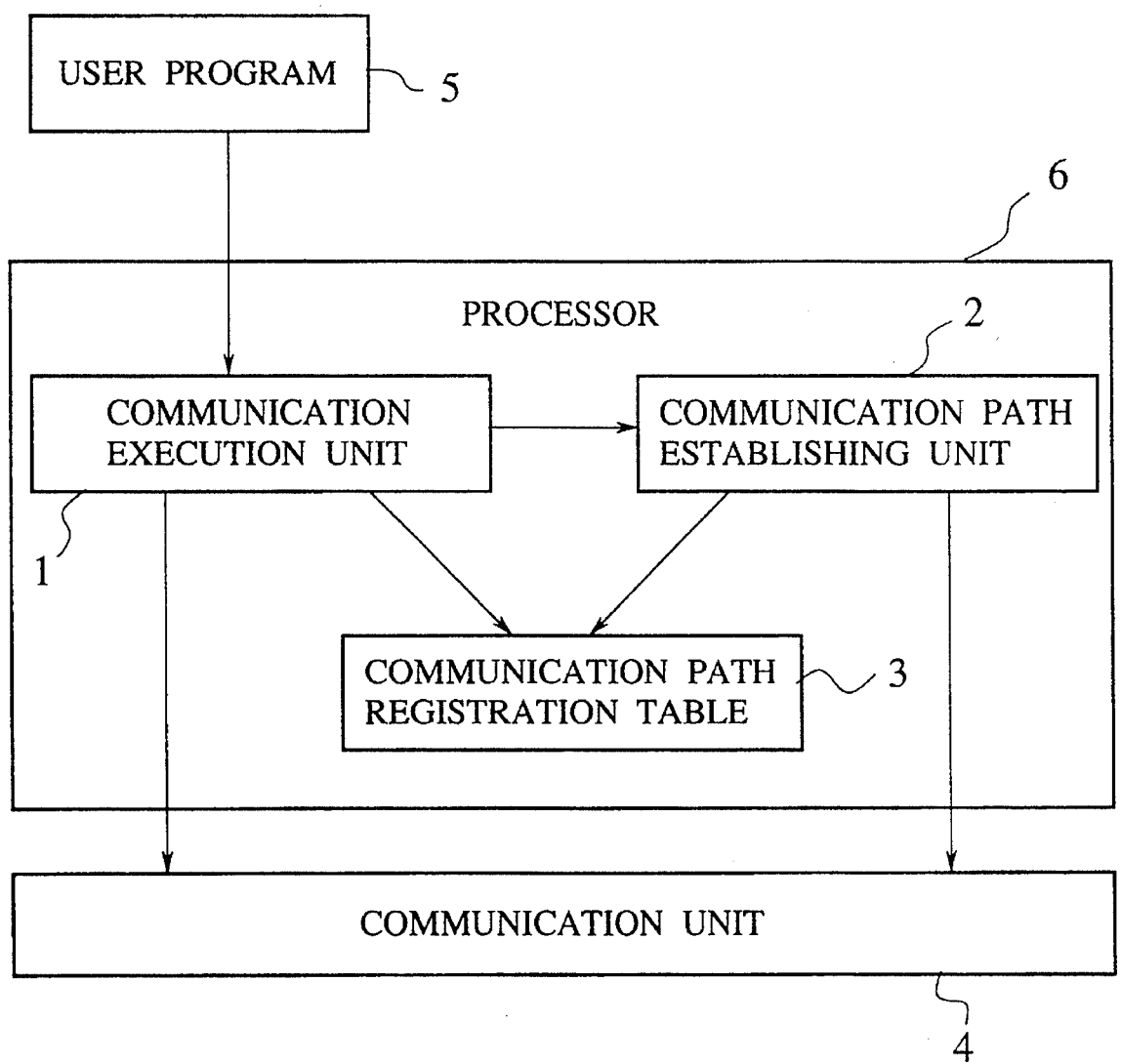
FIG. 1 is a schematic block diagram of each processor in a first embodiment of a connection-oriented communication system according to the present invention.

Referring now to FIG. 1, a first embodiment of a connection-oriented communication system according to the present invention will be described in detail.

In this first embodiment, each processor has a configuration as shown in FIG. 1. Namely, each processor 6 comprises: a communication execution unit 1 for executing the communication using a communication unit 4 in accordance with a user program 5; a communication path establishing unit 2 for establishing a communication path in the communication unit 4 with a communication path establishing unit 2 of a peer processor, in response to a request from the communication execution unit 1; and communication path registration table 3 accessed by the communication execution unit 1 and the communication path establishing unit 2 for registering the information on the communication path established by the communication path establishing unit 2.

The communication execution unit 1 executes the communication commanded by the user program 5 by using a connection-oriented communication path provided by the communication unit 4. This communication execution unit 1 also looks up the communication path registration table 3 and makes a communication path re-establishment request to the communication path establishing unit 2 on demand.

In response to the communication path re-establishment request from the communication execution unit 1, the communication path establishing units 2 of this processor 6 and its peer processor re-connects an appropriate communication path and the communication path establishing unit 2 of this processor 6 returns the connected communication port to the communication execution unit 1 of this processor 6, while the communication path establishing unit 2 of its peer processor registers the information on the re-established communication path into the communication path registration unit 3 of the peer processor.

The communication path registration unit 3 registers the information on the communication path established by the communication path establishing unit 2 in a format of <a communication port of a communicating program, a communication port of a peer program, a new communication port>.

In this configuration of FIG. 1, the communication execution unit 1 can obtain the addresses of the communication ports of the communicating program and the peer program with respect to the connection-oriented communication path provided by the communication unit 4.

In addition, the communication execution unit 1 and the communication path establishing unit 2 can pass the communication port therebetween, where the communication port is specified by data containing a processor ID and a port ID.

Figure 2A:
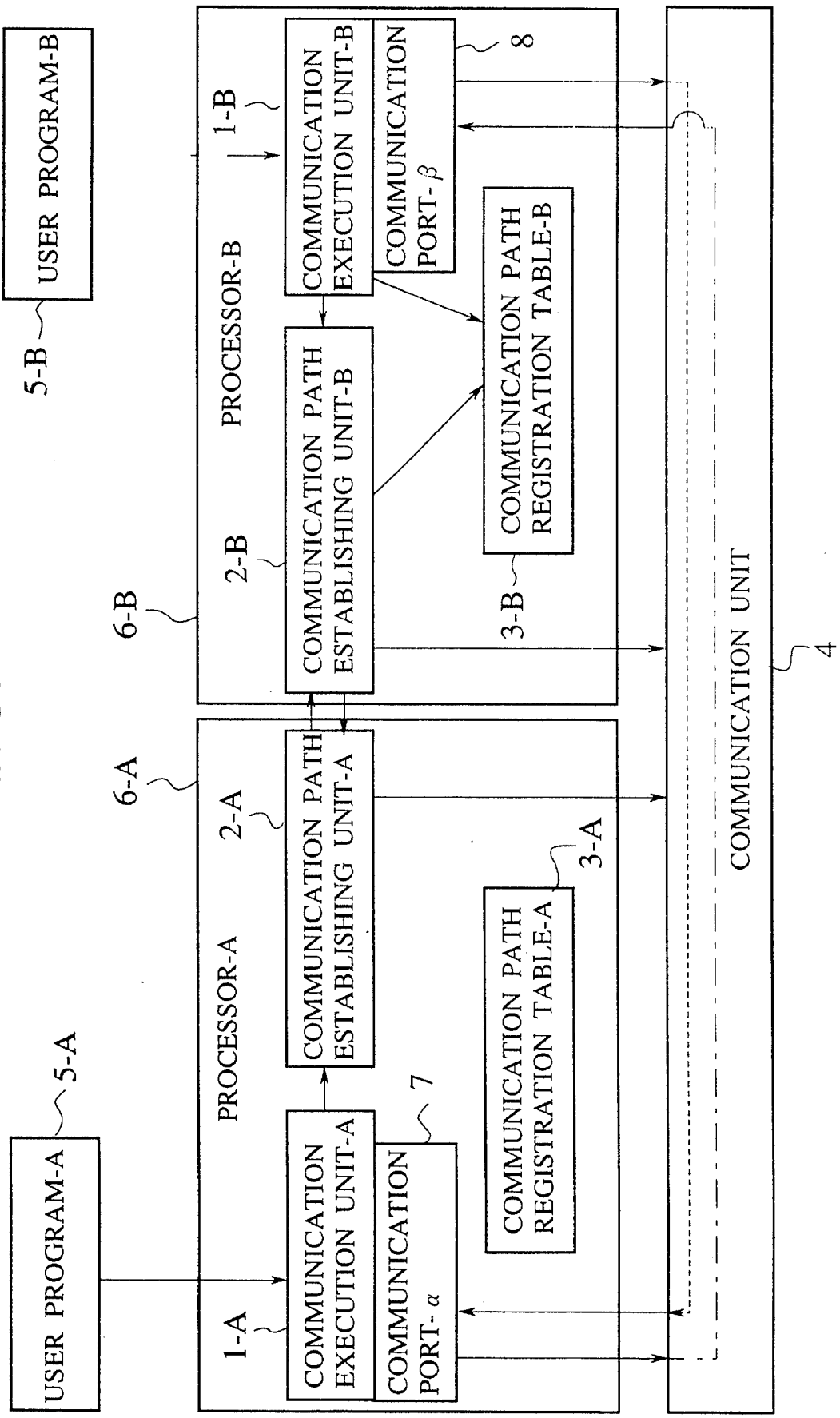
FIGS. 2A and 2B are schematic block diagrams of exemplary configurations of a first embodiment of a connection-oriented communication system according to the present invention in a case mutually communicating user programs are located on different processors, and in a case mutually communicating user programs are located on the same processors, respectively.

Now, in this first embodiment of a connection-oriented communication system, when the mutually communicating user programs are located on different processors, the system appears as shown in FIG. 2A, in which each of the processor-A 6-A on which the user programs-A 5-A is located and the processor-B 6-B on which the user program-B 5-B is located has the configuration of FIG. 1, and the communication execution unit-A 1-A and the communication execution unit-B 1-B have the communication port-α 7 and the communication port-β 8, respectively, which are connected through the common communication unit 4.

Figure 2B:
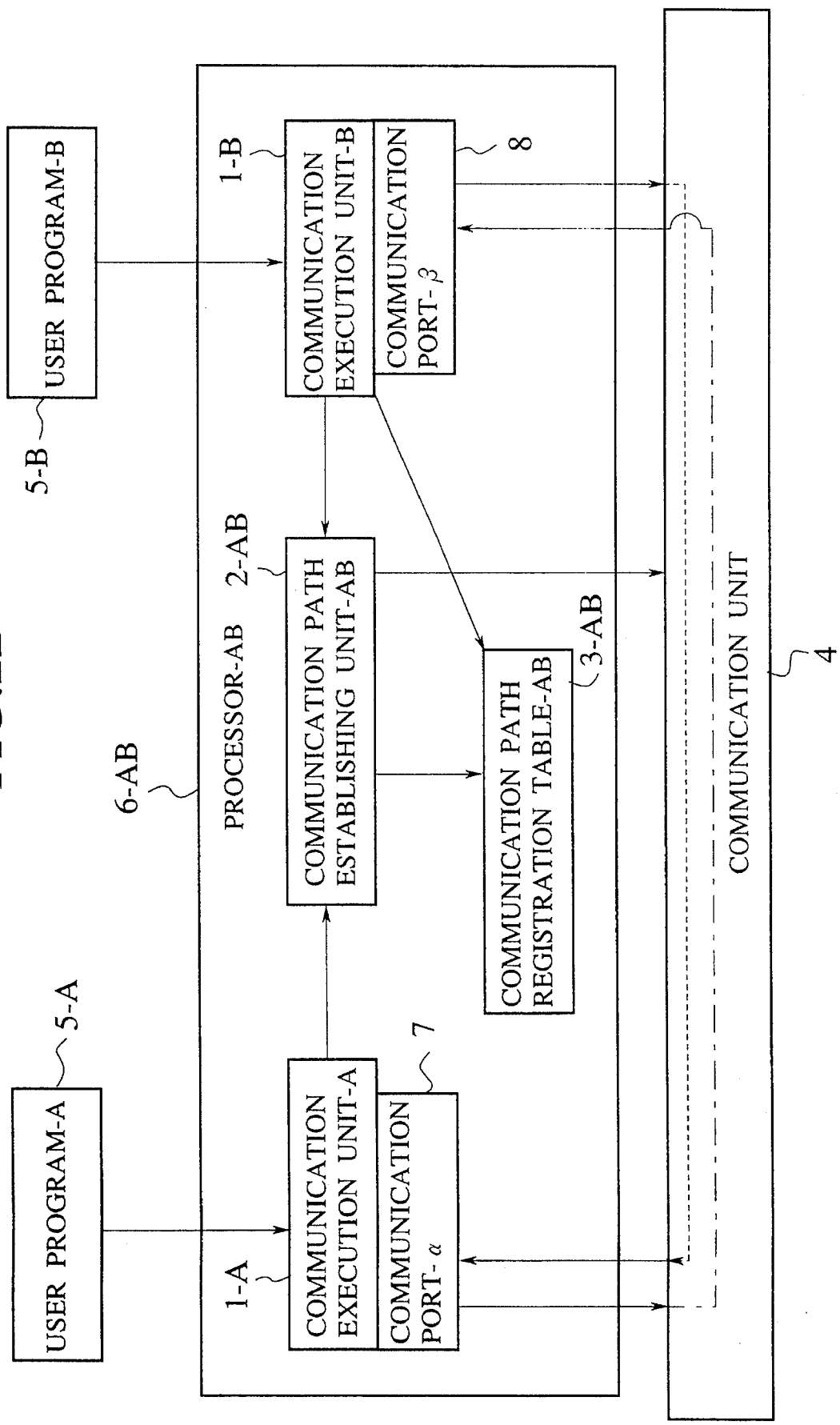

On the other hand, when the mutually communicating user programs are located on the same processor, the system appears as shown in FIG. 2B, in which the processor-AB 6-AB on which both the user program-A 5-A and the user program-B 5-B are located has a configuration in which the configuration of FIG. 1 is modified such that the processor-AB 6-AB has the communication execution unit-A 1-A provided in correspondence to the user program-A 1-A and the communication execution unit-B 1-B provided in correspondence to the user program-B 5-B, and the common communication path establishing unit-AB 2-AB and the common communication path registration table-AB 3-AB which are called by both the communication execution unit-A 1-A and the communication execution unit-B 1-B as well as with each other, where the communication execution unit-A 1-A and the communication execution unit-B 1-B have the communication port-$\alpha$ 7 and the communication port-$\beta$ 8, respectively, which are connected through the common communication unit 4.

Figure 4A:
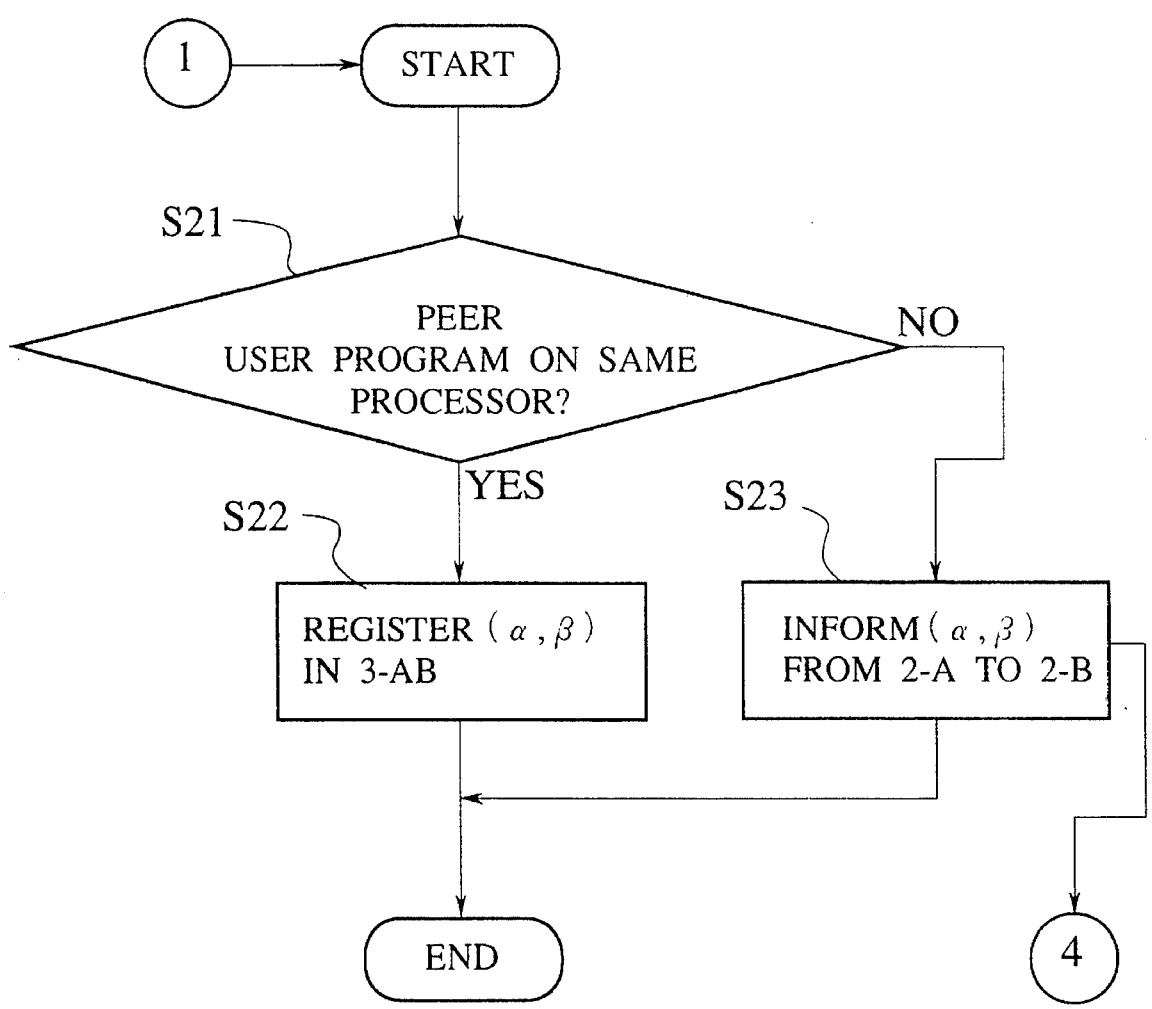
FIGS. 4A and 4B are flow charts for the operations of a communication path establishing unit on a communication requesting side in the system of FIGS. 2A and 2B at a time of the closing of the communication port, and at a time of the re-establishing the connection, respectively.
Figure 4B:
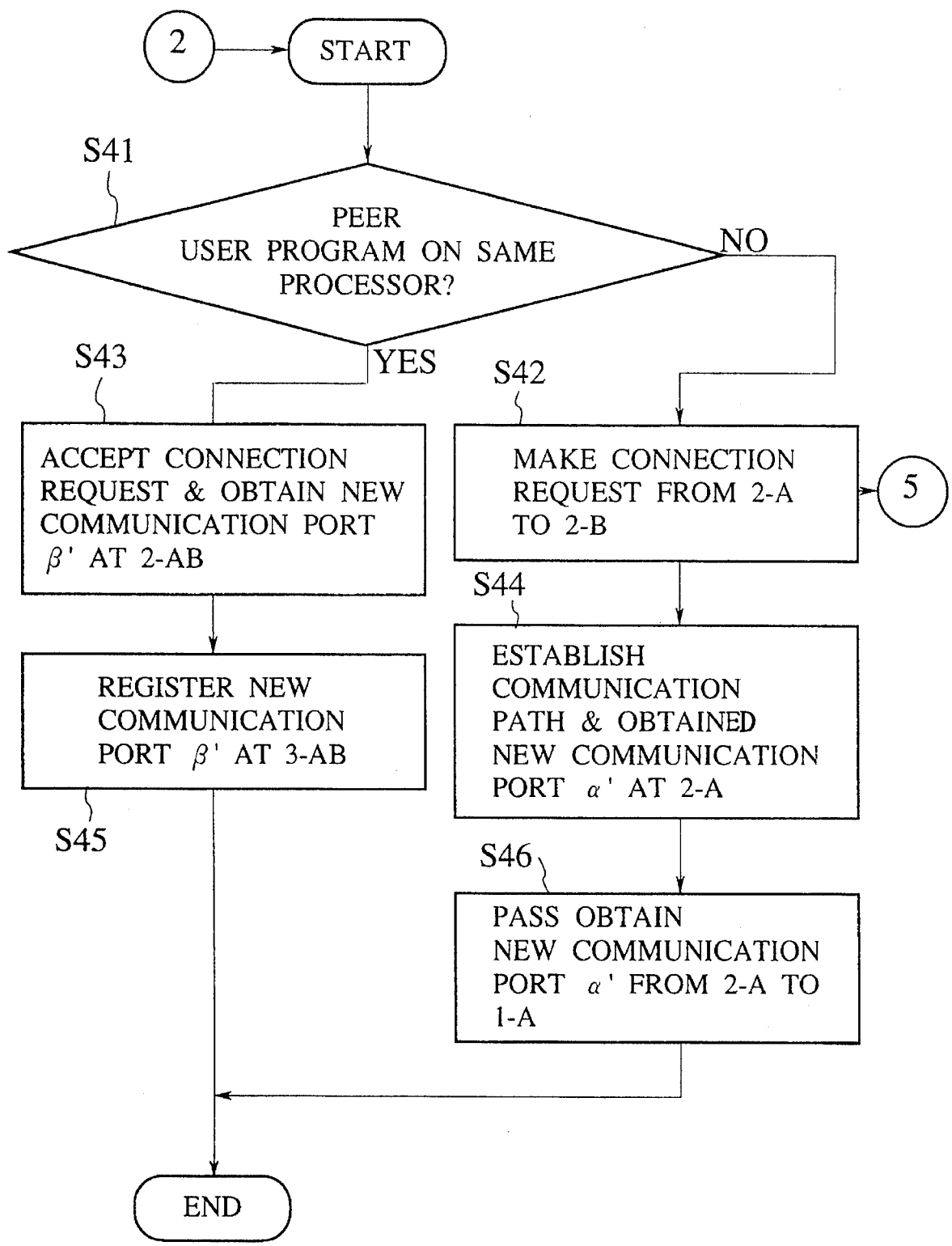
Figure 5A:
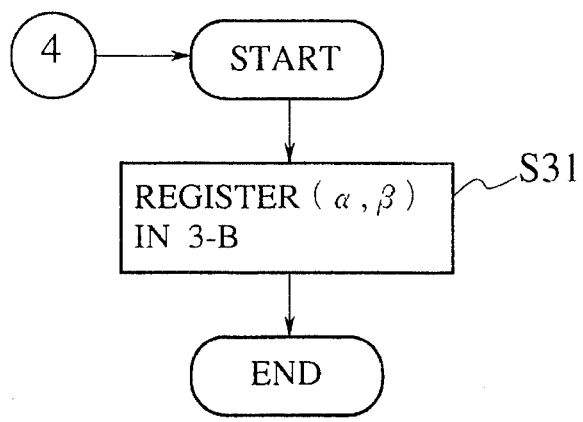
FIGS. 5A, 5B, and 5C are flow charts for the operations of a communication path establishing unit on a communication accepting side in the system of FIGS. 2A and 2B at a time of the closing of the communication port, at a time of re-establishing the connection, and at a time of executing the communication, respectively.
Figure 5B:
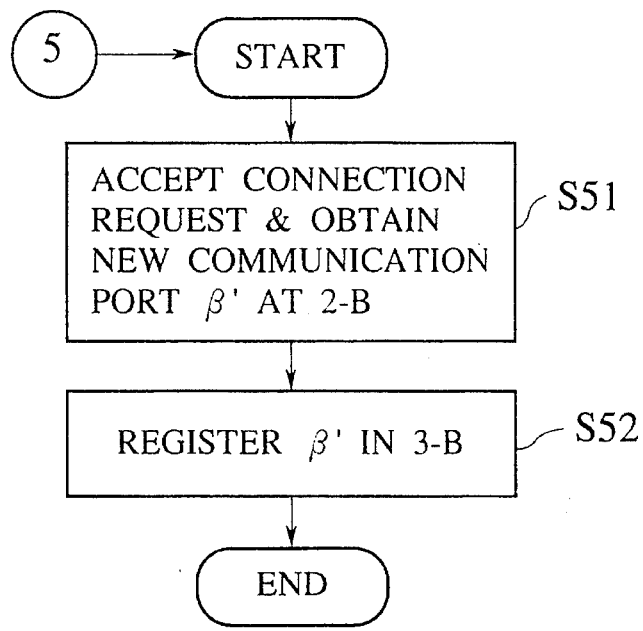
Figure 5C:
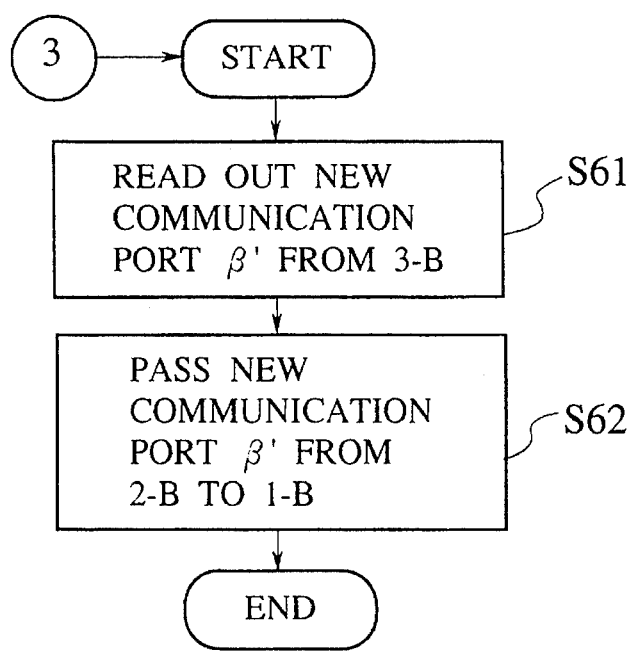

Now, the operation of this first embodiment of a connection-oriented communication system will be described in detail for cases shown in FIGS. 2A and 2B, with references to the flow charts of FIGS. 3A, 3B, 4A, 4B, 5A, 5B, and 5C. Of these, FIG. 3A is for the operation of the communication execution unit-A 1-A at a time of closing the communication port and re-establishing the connection, FIG. 3B is for the operation of the communication execution unit-B 1-B at a time of executing the communication, FIGS. 4A and 4B are for the operations of the communication path establishing unit-A 2-A or the communication path establishing unit-AB 2-AB at a time of the closing of the communication port and at a time of the re-establishing the connection, respectively, and FIGS. 5A, 5B, and 5C are for the operations of the communication path establishing unit-B 2-B at a time of the closing of the communication port, at a time of re-establishing the connection, and at a time of executing the communication, respectively.

First, in a case of FIG. 2A, the communication port-$\alpha$ 7 and the communication port-$\beta$ 8 are already connected through the communication path provided by the communication unit 4, such that the user program-A 5-A located on the processor-A 6-A carries out the communication through the communication port-$\alpha$ 7 possessed by the communication execution unit-A 1-A, while the user program-B 5-B located on the processor-B 6-B carries out the communication through the communication port-$\beta$ 8 possessed by the communication execution unit-B 1-B.

In such a state, a procedure for the communication execution unit-A 1-A to close its communication port-$\alpha$ 7 and then re-establish the connection, and for the communication execution unit-B 1-B to execute the communication by using the re-established connection will be described now. Here, in general, the closing of the communication port-$\alpha$ 7 is commanded at a time of the program transfer due to the detection of the malfunction or the excessive load on the processor-A 6-A, and the communication path re-establishment request is made from the processor to which the execution of this user program-A 5-A is transferred.

Figure 3A:
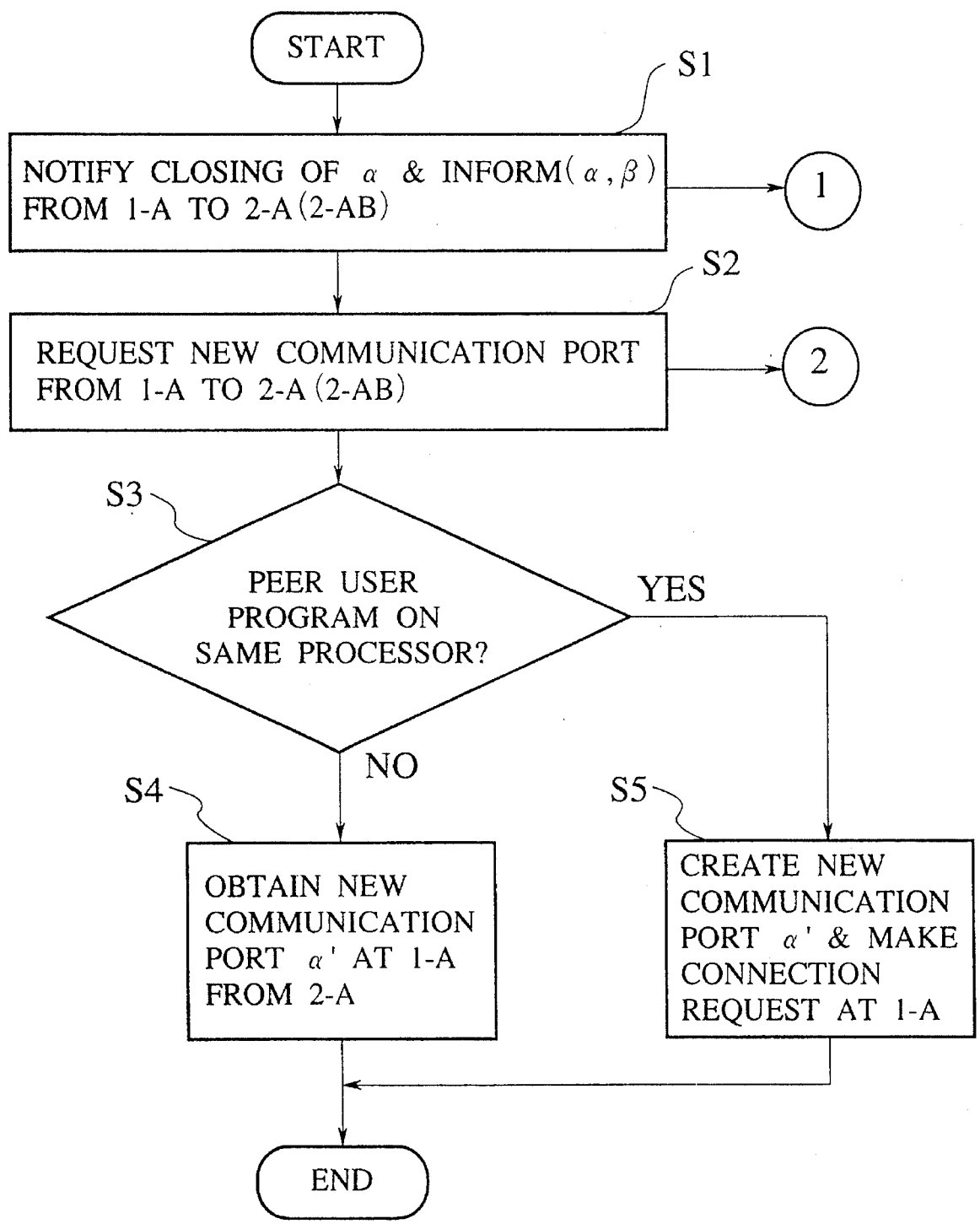
FIGS. 3A and 3B are flow charts for the operations of a communication execution unit in the system of FIGS. 2A and 2B at a time of closing the communication port and re-establishing the connection, and at a time of executing the communication, respectively.
Figure 3B:
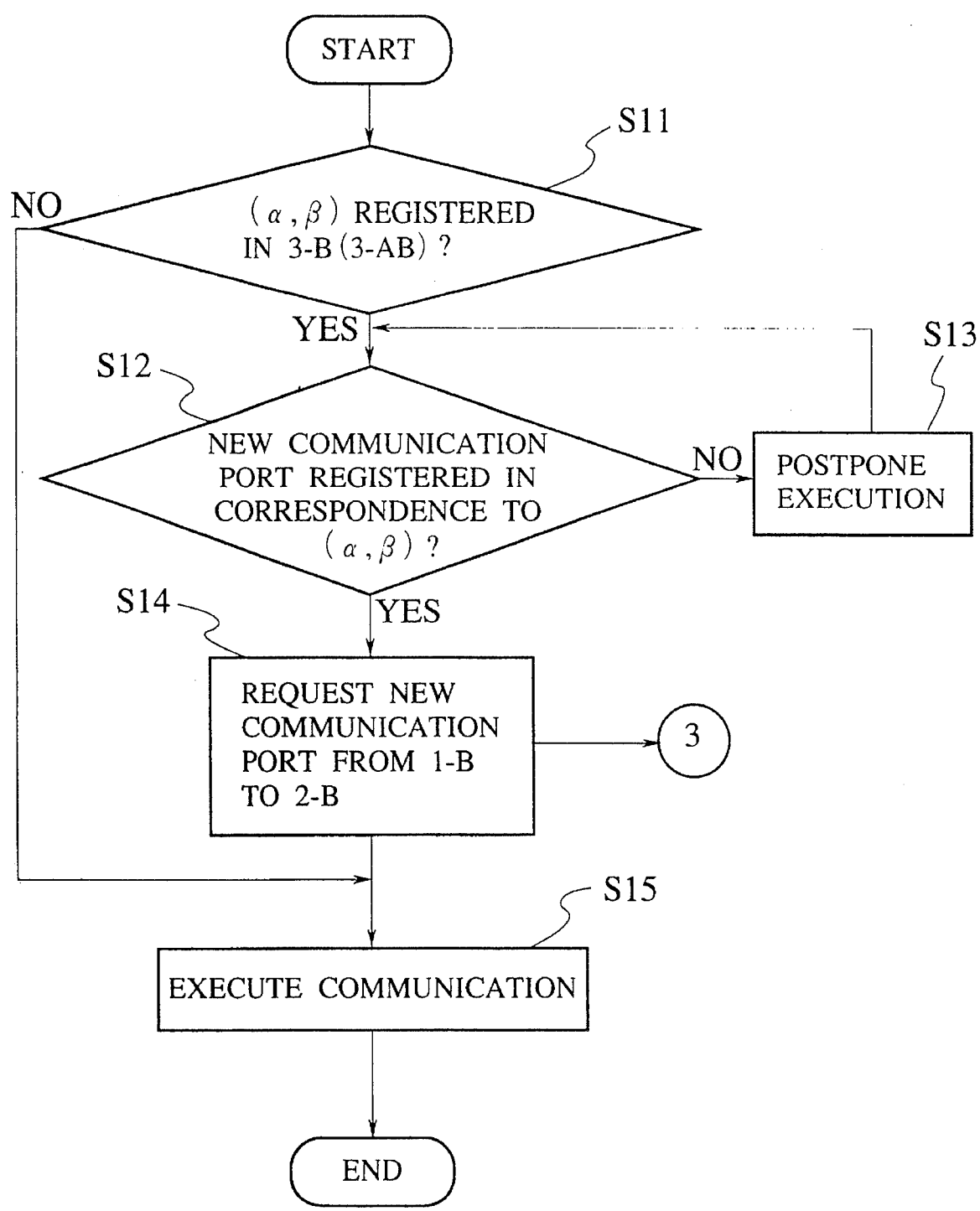

Now, at a time of closing the communication port-$\alpha$ 7, first at step S1 of FIG. 3A, the communication execution unit-A 1-A notifies the closing of the communication port-$\alpha$ 7 and informs the communication path information ($\alpha$, $\beta$) specifying the communication port-$\alpha$ 7 and the peer communication port-$\beta$ 8, to the communication path establishing unit-A 2-A.

In this case, the peer user program-B 5-B is not located on the same processor-A 6-A (No for the step S21 in FIG. 4A), so that next at the step S23 in FIG. 4A, the communication path establishing unit-A 2-A informs this communication path information ($\alpha$, $\beta$) to the communication path establishing unit-B 2-B on the processor-B 6-B.

Then, at the step S31 in FIG. 5A, the communication path establishing unit-B 2-B registers this communication path information ($\alpha$, $\beta$) into the communication path registration table-B 3-B on the same processor-B 6-B.

Next, at a time of re-establishing the connection, first at the step S2 in FIG. 3A, the communication execution unit-A 1-A makes a request for a new communication port to the communication path establishing unit-A 2-A by informing the communication path information ($\alpha$, $\beta$).

In this case, the peer program-B 5-B is not located on the same processor-A 6-A (No for the step S41 in FIG. 4B), so that next at the step S42 in FIG. 4B, the communication path establishing unit-A 2-A makes the connection request for the communication path corresponding to the communication path information ($\alpha$, $\beta$) to the communication path establishing unit-B 2-B. Then, at the step S44 in FIG. 4B, the communication path is established between the communication path establishing unit-A 2-A and the communication path establishing unit-B 2-B such that the communication path establishing unit-A 2-A can obtain the new communication port-$\alpha$' of the newly established communication path, and at the step S46 in FIG. 4B, the communication path establishing unit-A 2-A passes the obtained new communication port-$\alpha$' to the communication execution unit-A 1-A.

On the other hand, at the step S51 in FIG. 5B, the communication path establishing unit-B 2-B accepts the connection request from the communication path establishing unit-A 2-A such that the communication path establishing unit-B 2-B can obtain the new communication port-$\beta$' of the newly established communication path, and at the step S52 in FIG. 5B, the communication path establishing unit-B 2-B registers the new communication port-$\beta$' in correspondence to the communication path information ($\alpha$, $\beta$) in the communication path registration table-B 3-B.

In this case, the peer user program-B 5-B is not located on the same processor-A 6-A (No for the step S3 in FIG. 3A), so that next at the step S4 in FIG. 3A, the communication execution unit-A 1-A obtains the new communication port-$\alpha$' from the communication path establishing unit-A 2-A.

Next, at a time of executing the communication from the user program-B 5-B through the communication port-$\beta$ 8, first at the step S11 in FIG. 3A, the communication execution unit-B 1-B check the communication path registration table-B 3-B to see if there is the communication path information for this own communication port-$\beta$ 8.

In a case there is no communication path information for this communication port-$\beta$ 8 in the communication path registration unit-B 3-B, the communication execution unit-B 1-B carries out the communication as usual at the next step S15, by using the communication port-$\beta$ 8 which is still connected in such a case.

On the other hand, in a case there is the communication path information for this communication port-$\beta$ 8 in the communication path registration unit-B 3-B, next at the step S12 in FIG. 3B, whether the new communication port is registered in correspondence to that communication path information or not is determined in the communication path registration table-B 3-B.

In a case there is no new communication port registered in correspondence to that communication path information in the communication path registration table-B 3-B, next at the step S13 in FIG. 3B, the execution of the communication is postponed until the new communication port is registered in correspondence to that communication path information in the communication path registration table-B 3-B.

On the other hand, in a case there is the new communication port registered in correspondence to that communication path information in the communication path registration table-B 3-B, next at the step S14 in FIG. 3B, the communication execution unit-B 1-B makes a request for the new communication port of the newly established communication path to the communication path establishing unit-B 2-B.

In response to this request from the communication execution unit-B 1-B, next at the step S61 in FIG. 5C, the communication path establishing unit-B 2-B reads out the new communication port-$\beta'$ stored in correspondence to the communication path information ($\alpha$, $\beta$) from the communication path registration table-B 3-B, and then at the step S62, the communication path establishing unit-B 2-B passes this new communication port-$\beta'$ to the communication execution unit-B 1-B.

Then, at the step S15 in FIG. 3B, the communication execution unit-B 1-B executes the communication by using the newly established communication path ($\alpha'$, $\beta'$) instead of the original communication path ($\alpha$, $\beta$).

Next, in a case of FIG. 2B, the communication port-$\alpha$ 7 and the communication port-$\beta$ 8 are already connected through the communication path provided by the common communication unit 4, such that the user program-A 5-A and the user program-B 5-B which are located on the common processor-AB 6-AB carry out the communication through the communication port-$\alpha$ 7 possessed by the communication execution unit-A 1-A and the communication port-$\beta$ 8 possessed by the communication execution unit-B 1-B.

In this case, at a time of closing the communication port-$\alpha$ 7, first at the step S1 of FIG. 3A, the communication execution unit-A 1-A notifies the closing of the communication port-$\alpha$ 7 and informs the communication path information ($\alpha$, $\beta$) specifying the communication port-$\alpha$ 7 and the peer communication port-$\beta$ 8, to the communication path establishing unit-AB 2-AB.

In this case, the peer user program-B 5-B is located on the same processor-AB 6-AB (Yes for the step S21 in FIG. 4A), so that next at the step S22 in FIG. 4A, the communication path establishing unit-AB 2-AB registers the communication path information ($\alpha$, $\beta$) into the communication path registration table-AB 3-AB.

Next, at a time of re-establishing the connection, first at the step S2 in FIG. 3A, the communication execution unit-A 1-A makes a request for a new communication port to the communication path establishing unit-AB 2-AB by informing the communication path information ($\alpha$, $\beta$).

In this case, the peer user program-B 5-B is located on the same processor-AB 6-AB (Yes for the step S3 in FIG. 3A, so that next at the step S5 in FIG. 3A, the communication execution unit-A 1-A crates the new communication port $\alpha'$ and makes the connection request for the communication path corresponding to the communication path information ($\alpha$, $\beta$) to the communication path establishing unit-AB 2-AB.

Then, as the peer user program-B 5-B is located on the same processor-AB 6-AB (Yes for the step S41 in FIG. 4B), next at the step S43 in FIG. 4B, the communication path establishing unit-AB 2-AB accepts the connection request from the communication execution unit-A 1-A such that the communication path establishing unit-AB 2-AB obtains the new communication port-$\beta'$, and at the step S45 in FIG. 4B, the communication path establishing unit-AB 2-AB registers the new communication port-$\beta'$ in correspondence to the communication path information (60, $\beta$) in the communication path registration table-AB 3-AB.

Then, at a time of executing the communication from the user program-B 5-B through the communication port-$\beta$ 8, the operation similar to that described above for a case of FIG. 2A is carried out by the communication execution unit-B 1-B.

In this manner, it is possible in this first embodiment to realize a connection-oriented communication system in which the communication path re-establishment can be achieved automatically, without requiring the programming of the procedures for the re-establishment of the communication path in the mutually communicating programs.

According to this first embodiment, the closing of the communication port and the re-establishing of the connection are carried out by the communication execution unit and the communication path establishing unit on each processor, so that the user program is totally unaware of the occurrences of the closing of the communication port and the re-establishing of the connection, and it suffices for each user program to command the data transfer to the associated communication execution unit as if there is not re-connection.

Now, the operation of this first embodiment of a connection-oriented communication system described above in conjunction with the flow charts of FIGS. 3A, 3B, 4A, 4B, 5A, 5B, and 5C can be simplified by replacing the flow charts of FIG. 3A and FIG. 4B by the flow charts of FIGS. 6A and 6B, as follows.

Figure 6A:
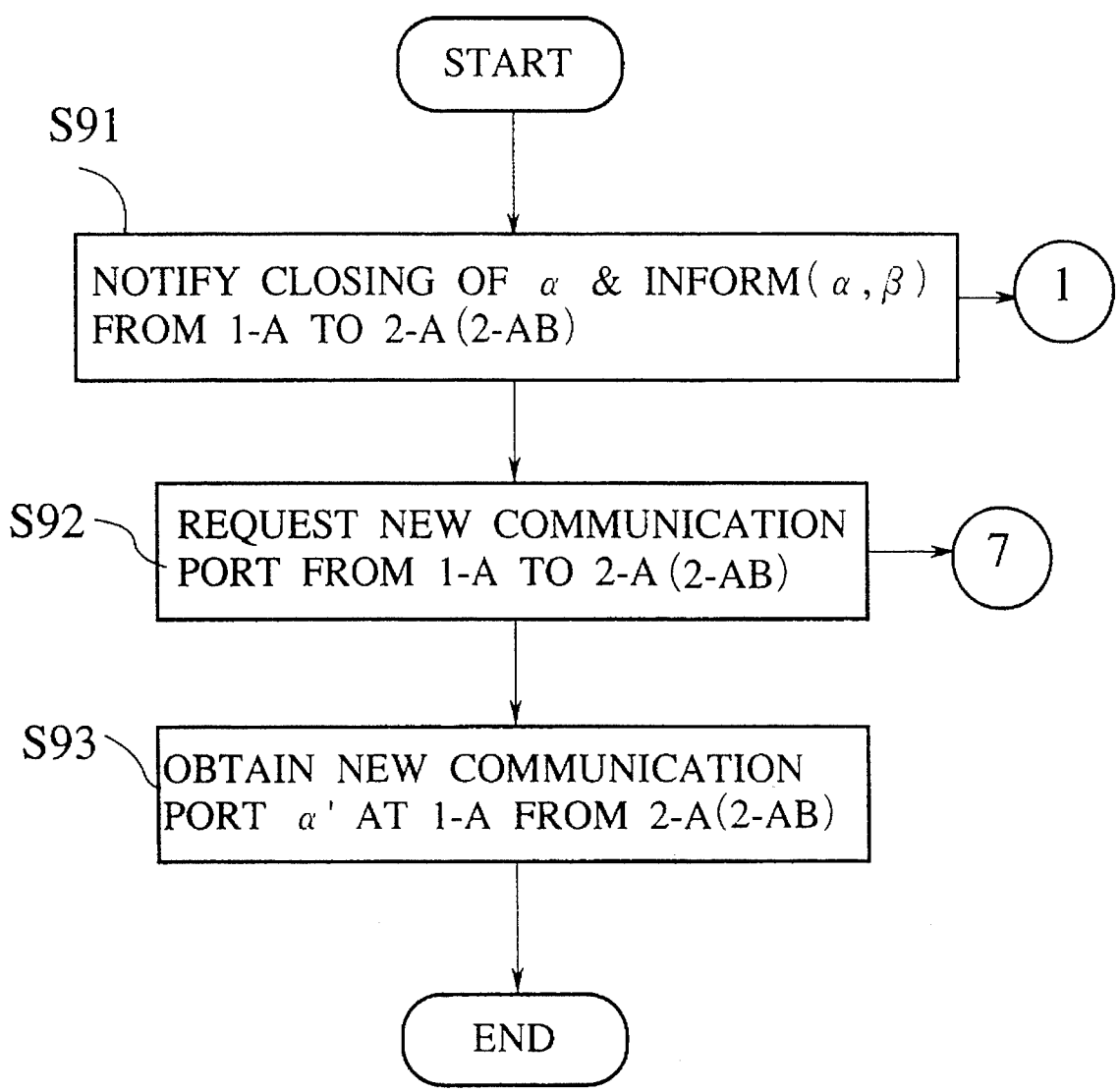
FIGS. 6A and 6B are flow charts for the operations of a communication execution unit and a communication path establishing unit in the system of FIGS. 2A and 2B, for replacing the flow charts of FIGS. 3A and 4A, respectively, in a simplified operation procedure.

Namely, at a time of closing the communication port-$\alpha$ 7 and re-establishing of the connection, first at the step S91 in FIG. 6A, the communication execution unit-A 1-A notifies the closing of the communication port-$\alpha$ 7 and informs the communication path information ($\alpha$, $\beta$) specifying the communication port-$\alpha$ 7 and the peer communication port-$\beta$ 8, to the communication path establishing unit-A 2-A (or the communication path establishing unit-AB 2-AB). Then, the communication path establishing unit-A 2-A (or the communication path establishing unit-AB 2-AB) carries out the operation of FIG. 4A as described above.

Then, at the step S92 in FIG. 6A, the communication execution unit-A 1-A makes a request for a new communication port to the communication path establishing unit-A 2-A (or the communication path establishing unit-AB 2-AB) by informing the communication path information ($\alpha$, $\beta$). Here, however, next at the step S93, regardless of whether the peer user program-B 5-B is located on the same processor or not, the communication execution unit-A 1-A obtains the new communication port-$\alpha'$ from the communication path establishing unit-A 2-A (or the communication path establishing unit-AB 2-AB).

Figure 6B:
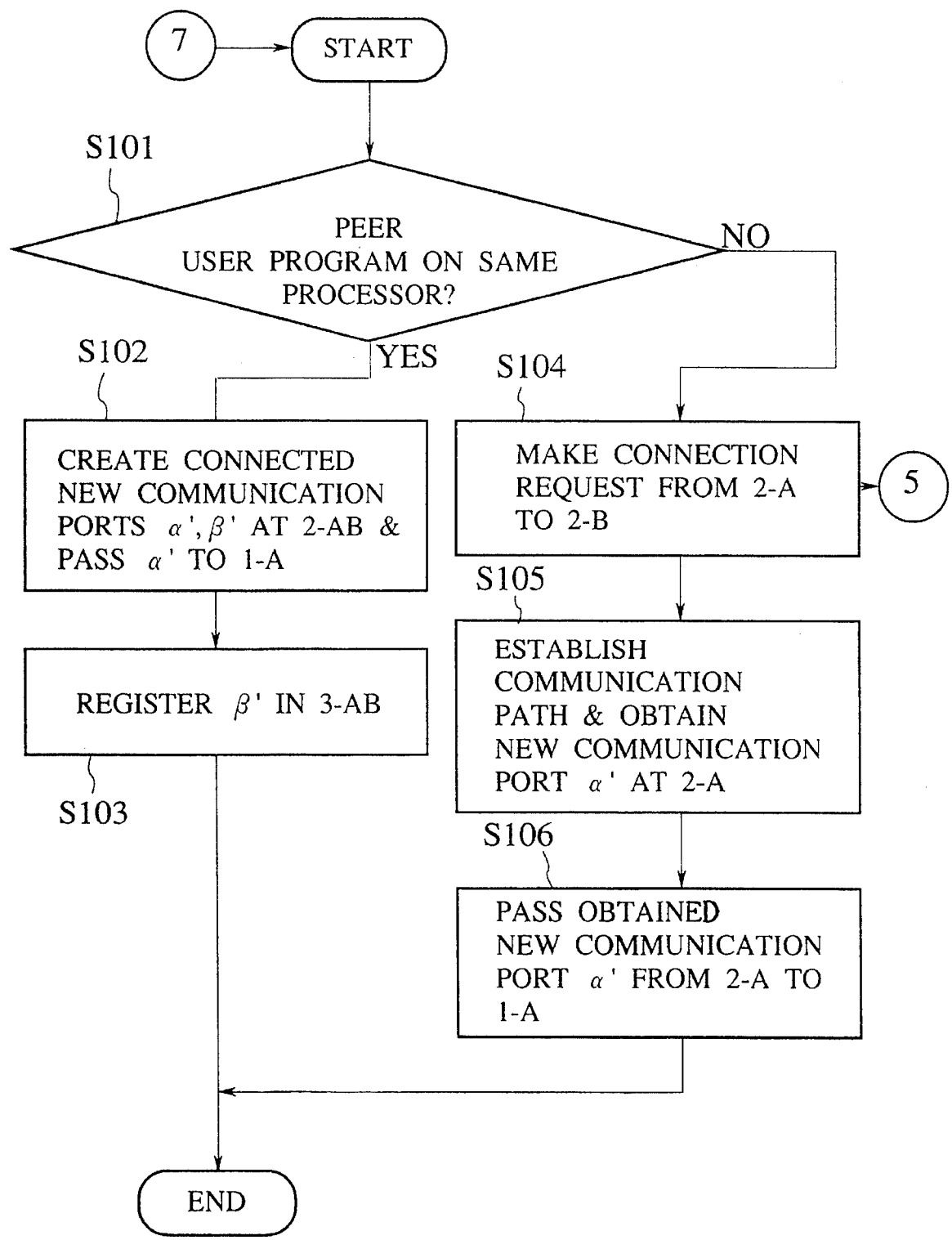

On the other hand, in response to the connection request made from the communication execution unit-A 1-A at the step S92, next at the step S101 in FIG. 6B, when the peer user program-B 5-B is not located on the same processor (No for the step S101 in FIG. 6B), the communication path establishing unit-A 2-A carries out the operations of the steps S104, S105, and S106 which are identical to those of the steps S42, S44, and S46 in FIG. 4B described above, such that the obtained new communication port-$\beta'$ is passed to the communication execution unit-A 1-A.

In contrast, when the peer user program-B 5-B is located on the same processor (Yes for the step S101 in FIG. 6B), next at the step S102, the communication path establishing unit-AB 2-AB creates a pair of connected new communication ports $\alpha'$ and $\beta'$, and passes one of the pair $\alpha'$ to the communication execution unit-A 1-A which is received at the step S93 described above, while at the step S103, the communication path establishing unit-AB 2-AB registers the other one $\beta'$ of the pair into the communication path registration table-AB 3-AB in correspondence to the communication path information ($\alpha$, $\beta$).

Then, at a time of executing the communication from the user program-B 5-B through the communication port-$\beta$ 8, the communication execution unit-B 1-B carries out the same operations of FIG. 3A as described above.

Figure 7:
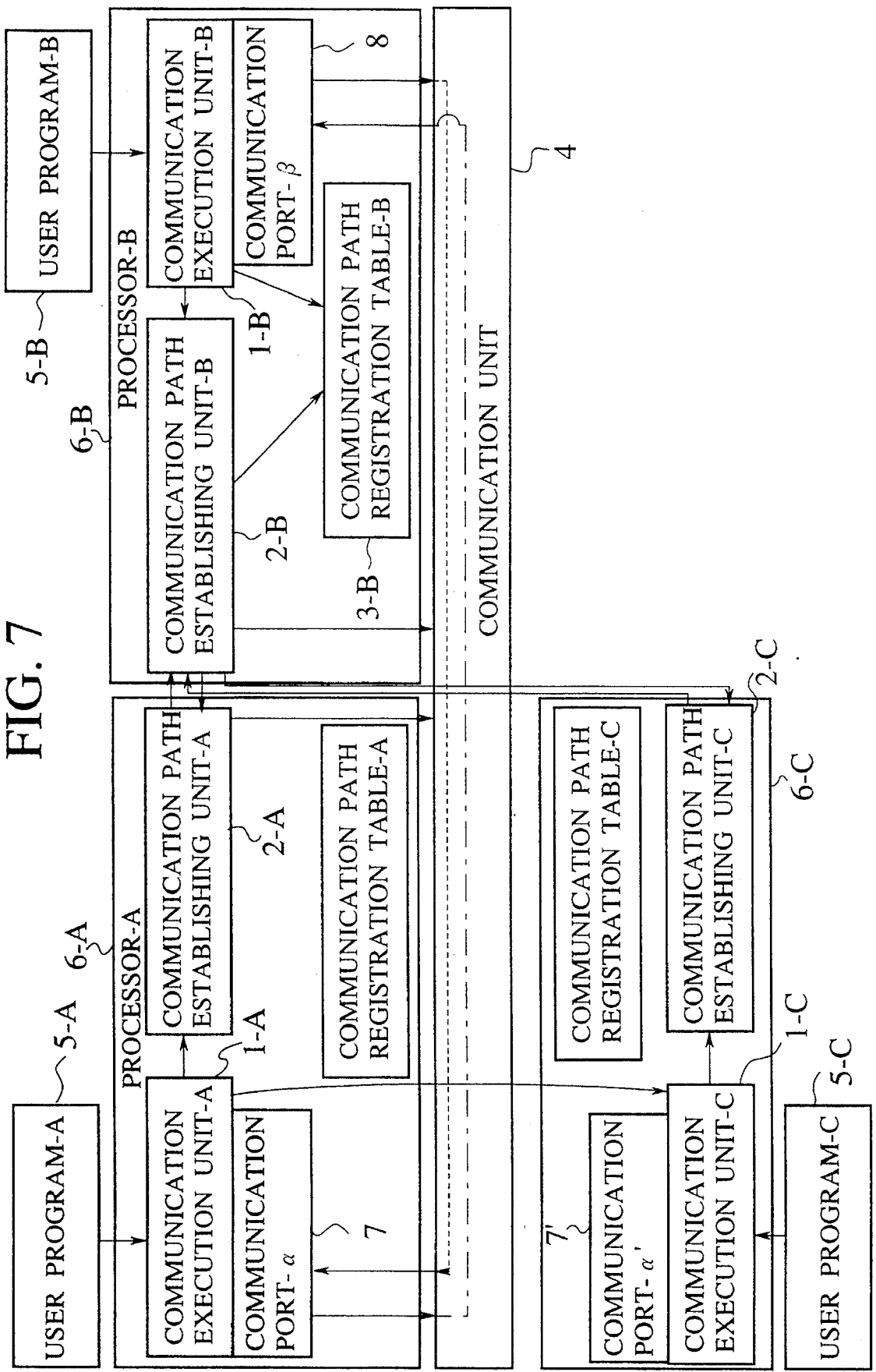
FIG. 7 is a schematic block diagram of an exemplary configuration of a first embodiment of a connection-oriented communication system according to the present invention in a case a communication requesting side moves from one processor to another at a time of the closing of the communication port and at a time of re-establishing the connection.

Next, in this first embodiment of a connection-oriented communication system, when the closing of the communication port and the re-establishing the connection are carried out on different processors, the system appears as shown in FIG. 7, in which each of the processor-A 6-A on which the user program-A 5-A is originally located and the processor-B 6-B on which the user program-B 5-B is located has the configuration of FIG. 1, and the communication execution unit-A 1-A and the communication execution unit-B 1-B have the communication port-α 7 and the communication port-β 8, respectively, which are connected through the common communication unit 4. In addition, there is provided a processor-C 5-C to which the execution of the user program-A 5-A is transferred and from which the communication path re-establishment request is made. This processor-C 6-C also has a configuration of FIG. 1 and the communication execution unit-C 1-C obtains the communication port-α' 7' as a replacement for the communication port-α 7.

In this case of FIG. 7, the operation of this first embodiment of a connection-oriented communication system is carried out by replacing the flow chart of FIG. 3A by the flow charts of FIGS. 8A and 8B, as follows, Namely, at a time of closing the communication port-α 7, first at the step S71 in FIG. 8A, the communication execution unit-A 1-A notifies the closing of the communication port-α 7 and informs the communication path information (α, β) specifying the communication port-α 7 and the peer communication port-β[8, to the communication path establishing unit-A 2-A.

Figure 8A:
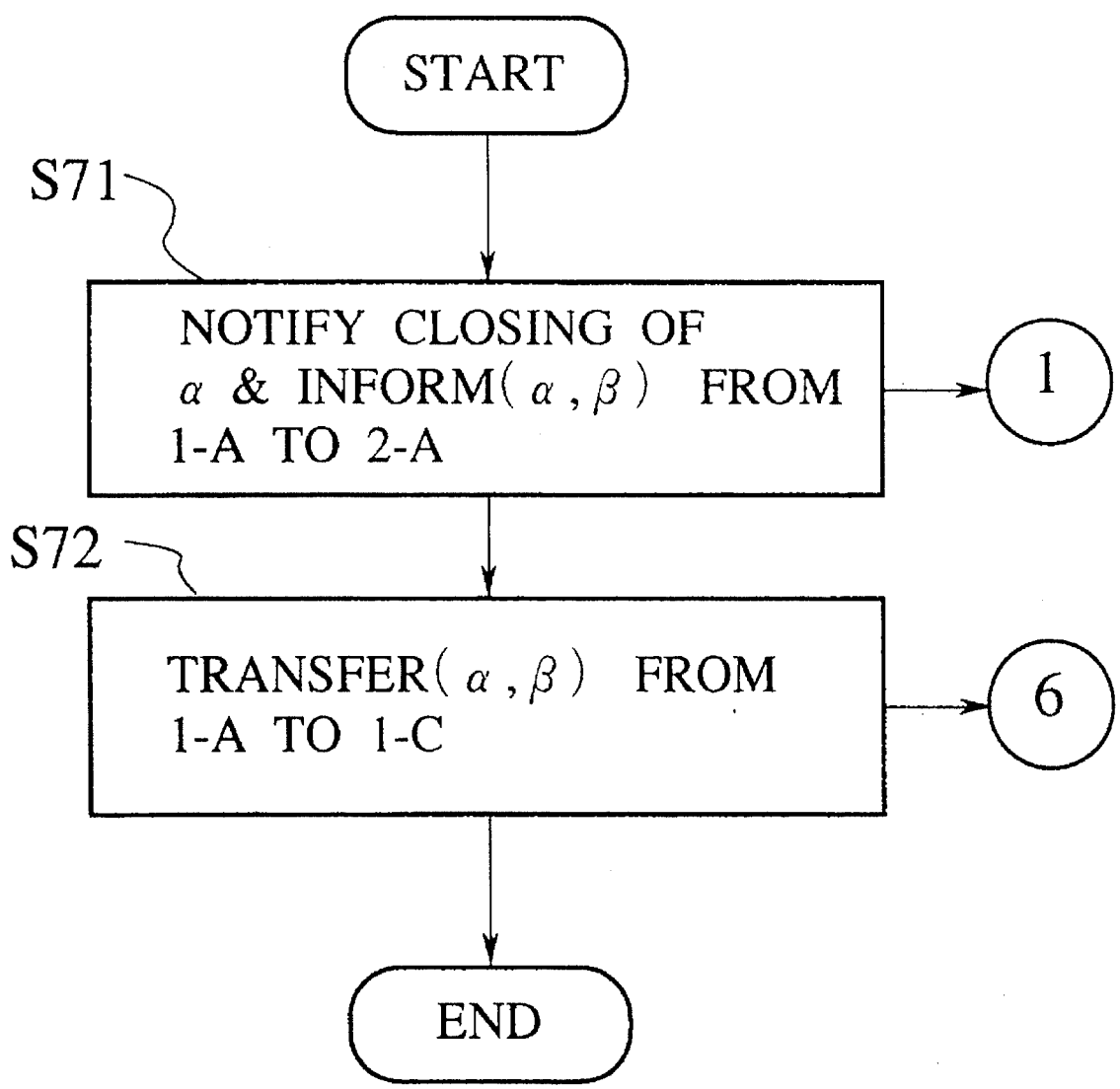
FIGS. 8A and 8B are flow charts for the operations of a communication execution unit in the system of FIG. 7, for replacing the flow chart of FIG. 3A.

Then, at the step S72 in FIG. 8A, the communication execution unit-A 1-A passes the communication path information (α, β) to the communication execution unit-C 1-C on the processor-C 6-C.

Figure 8B:
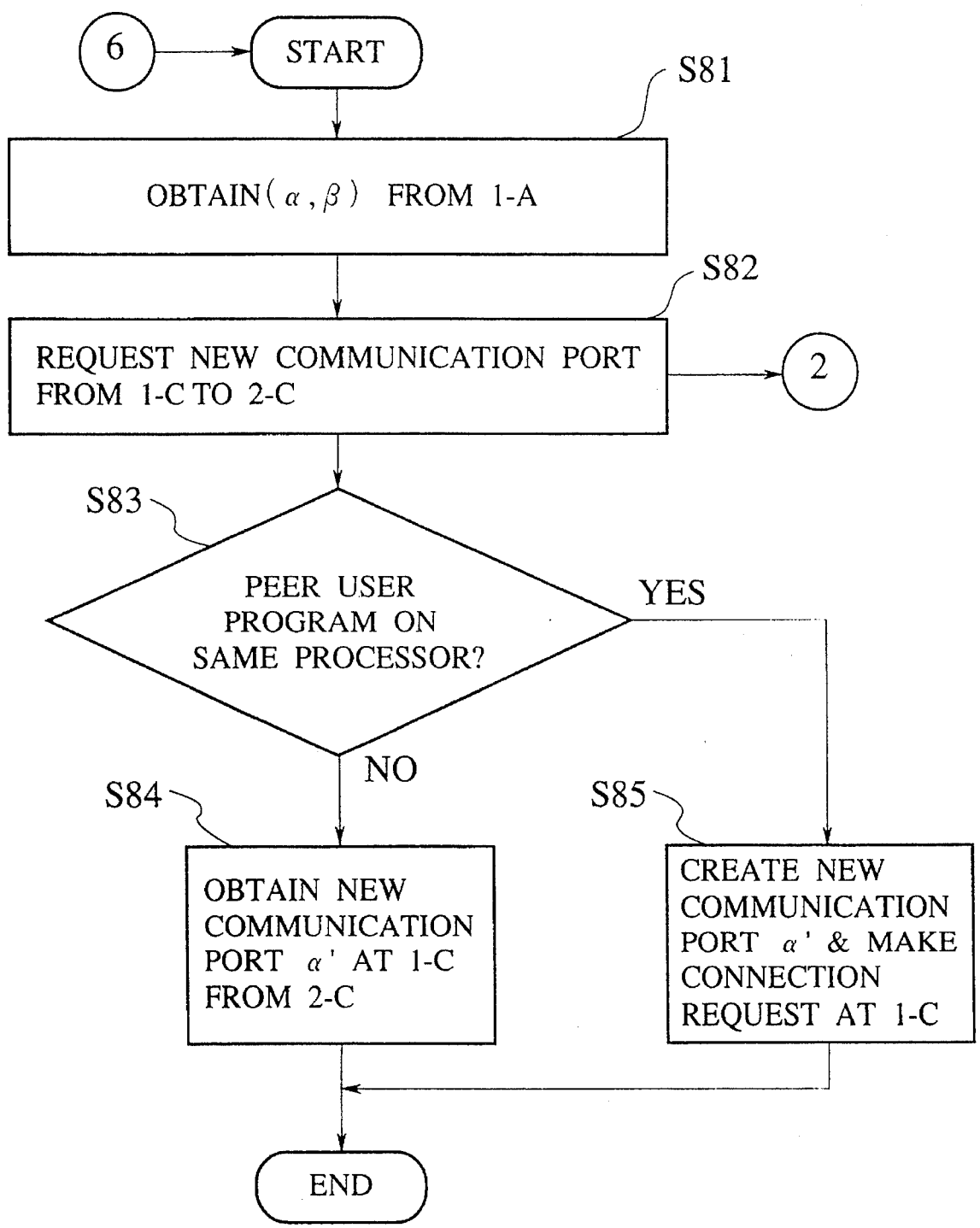

Next, at a time of re-establishing the connection, first at the step S81 in FIG. 8B, the communication execution unit-C 1-C obtains the communication path information (α, β) from the communication execution unit-A 1-A.

Then, at the step S82 of FIG. 8B, the communication execution unit-C 1-C makes a request for a new communication port to the communication path establishing unit-C 2-C by informing the communication path information (α, β).

In a case the peer user program-B 5-B is not located on the same processor (No for the step S83 in FIG. 8B), next at the step S84 in FIG. 8B, the communication execution unit-C 1-C obtains the new communication port-α' from the communication path establishing unit-C 2-C.

On the other hand, in a case the peer user program-B 5-B is located on the same processor (Yes for the step S83 in FIG. 8B), next at the step S84 in FIG. 8B, the communication execution unit-C 1-C creates the new communication port-α' and makes the connection request for the communication path corresponding to the communication path information (α, β) to the communication path establishing unit-C 2-C.

The remaining operations of the communication execution unit and the communication path establishing units are similar to those of FIGS. 3B, 4A, 4B, 5A, 5B, and 5C.

In this manner, it is possible in this first embodiment to carry out the closing of the communication port and the re-establishing of the connection on different processors.

Next, the first embodiment of a connection-oriented communication system described above can be modified as follows.

Figure 9:
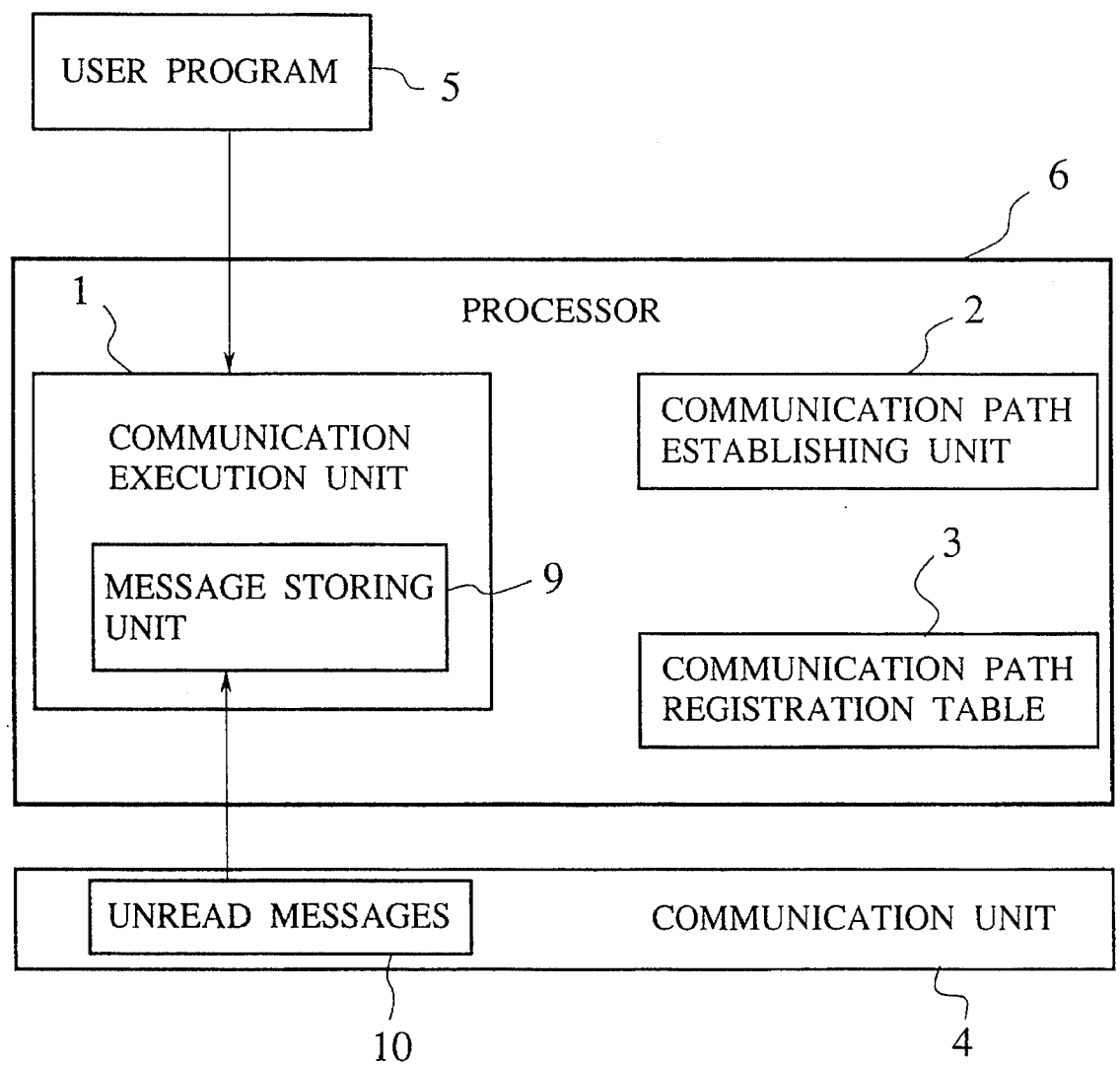
FIG. 9 is a schematic block diagram of a modified configuration of a first embodiment of a connection-oriented communication system according to the present invention.

Namely, the configuration of FIG. 1 described above can be modified to that shown in FIG. 9 in which the communication execution unit 1 is further equipped with a message storing unit 9 for storing unread messages 10 which are left in the communication path provided by the communication unit 4 at a time of the closing of the communication port.

Figure 10A:
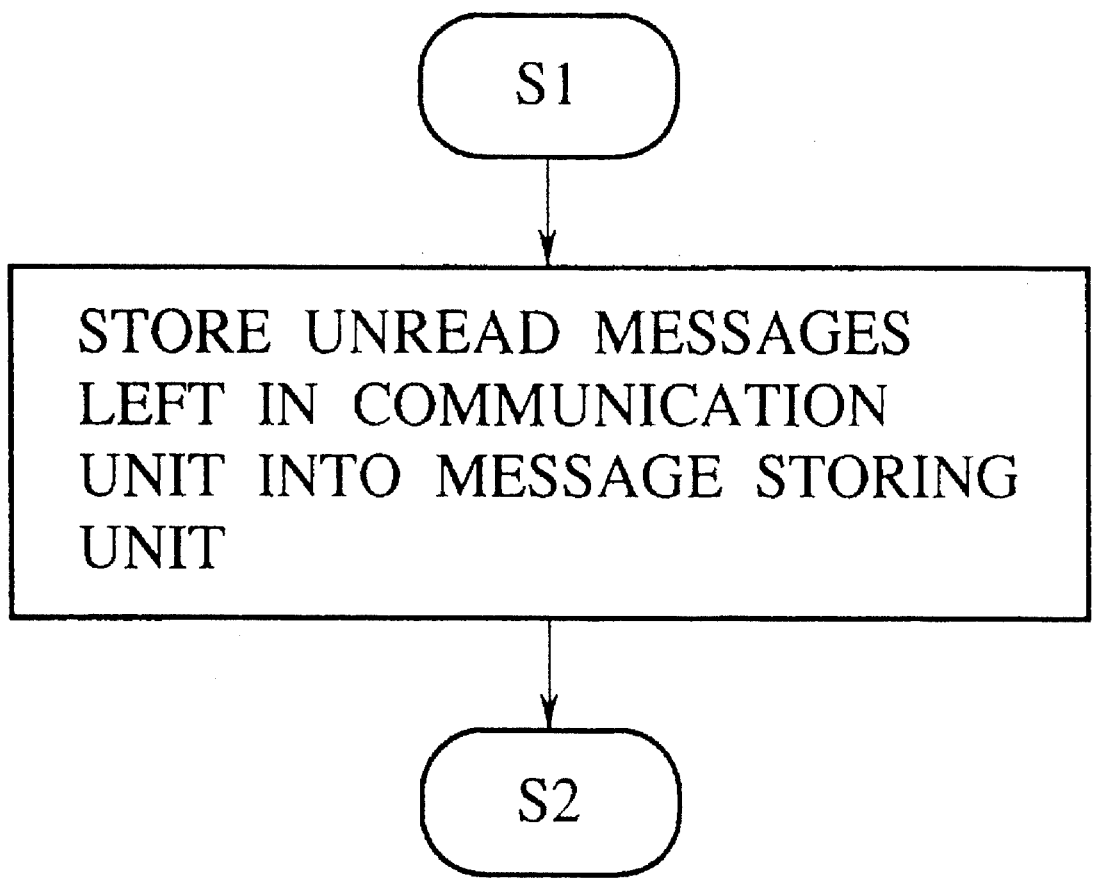
FIGS. 10A and 10B are flow charts for the additional operations of a communication execution unit in the system of FIG. 9 to be incorporated into the flow charts of FIGS. 3A and 3B.

In this case, the operation of the communication execution unit 1 at a time of the closing the communication port and the re-establishment of the connection shown in FIG. 3A described above is modified by incorporating the flow chart of FIG. 10A between the steps S1 and S2. In this flow chart of FIG. 10A, at the step S111, the communication execution unit 1 reads out the unread messages 10 left in the communication path provided by the communication unit 4 at a time of the closing of the communication path and stores the read out unread messages 10 in the message storing unit 9.

Figure 10B:
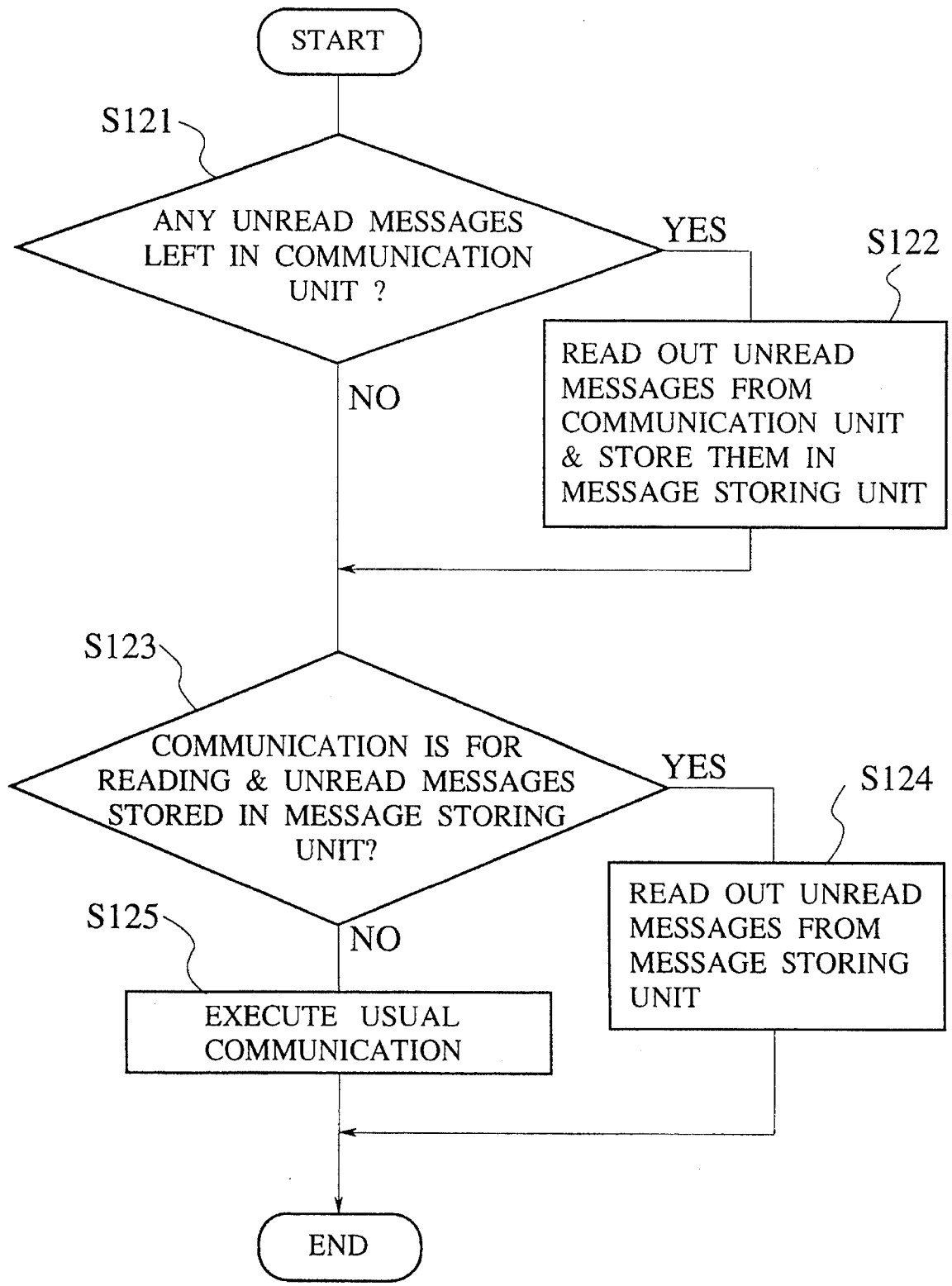

In addition, the operation of the communication execution unit 1 at a time of executing the communication shown in FIG. 3B described above is modified by replacing the step S15 by the flow chart of FIG. 10B. In this flow chart of FIG. 10B, first at the step S121, whether there are any unread messages 10 left in the old communication path provided by the communication unit 4, after the new communication port is obtained at the step S14, or not is determined. In a case there are unread messages 10, next at the step S122, these unread messages 10 are read out from the communication unit 4 and stored in the message storing unit 9 and stored in the message storing unit 9, and then the process proceeds to the next step S123, whereas otherwise, the process proceeds to the next step S123 directly.

At the step S123, whether the communication is for the reading and the unread messages 10 are stored in the message storing unit 9 or not is determined. In a case the communication is for the reading and the unread messages 10 are stored in the message storing unit 9, next at the step S124, the unread messages 10 stored in the message storing unit 9 are read out from the message storing unit 9. Otherwise, next at the step S125, the usual communication is executed just as in the step S15 in FIG. 3A described above.

With these modifications, even when there are some unread messages 10 left in the communication path provided by the communication unit 4 at a time of the closing of the communication port, or after the new communication port is obtained, the communication can be continued without loosing these unread messages 10.

Next, the first embodiment of a connection-oriented communication system described above can also be modified as follows.

Namely, the configuration of FIG. 2A described above can be modified to that shown in FIG. 11 in which the operations of the communication execution units on the communicating program side and the peer program side at a time of establishing a communication path can be made substantially identical.

In this case of FIG. 11, the operation at each of the communication path establishing units 2'-A and 2'-B is carried out according to the flow chart of FIG. 12, as follows, Namely, in this case, each of the communication execution unit-A 1'-A and the communication execution unit-B 1'-B make the connection request requesting a communication port of a communication path connected with a specified peer program, independently, to the communication path establishing unit-A 2'-A and the communication path establishing unit-B 2'-B, respectively. Here, it is assumed that there has been no connection between the communication execution unit-A 1'-A and the communication execution unit-B 1'-B previously, and the communication execution unit-A 1'-A makes the connection request first by specifying the user program-B 5-B as the peer program, while the communication execution unit-B 1'-B makes the connection request later by specifying the user program-A 5-A as the peer program.

Then, at the communication path establishing unit-A 2'-A which received the connection request from the communication execution unit-A 1'-A, whether any already connected communication path with respect to the specified peer program is stored or not is determined at the step S131.

In this case, there is no already connected communication path stored (No for the step S131) as assume above, so that next at the step S133, the communication path establishing unit-A 2'-A creates a new communication path with respect to the communication path establishing unit-B 2'-B, and returns one of the communication ports of the newly connected communication path to the communication execution unit-A 1'-A at the step S134. At this point, the communication path establishing unit-B 1'-B stores another one of the communication ports of the newly connected communication path.

Then, at the communication path establishing unit-B 2'-B which received the connection request from the communication execution unit-B 1'-B, whether any already connected communication path with respect to the specified peer program is stored or not is determined at the step S131.

In this case, there is an already connected communication path stored (Yes for the step S131) that has been established in response to the connection request made by the communication execution unit-A 1'-A earlier, so that next at the step S132, the communication path establishing unit-B 2'-B passes the stored one of the communication ports of the newly connected communication path to the communication execution unit-B 1'-B.

It is to be noted that, in a case the user program-A 5-A and the user program-B 5-B are located on the same processor, the operations at the step S133 and S134 can be modified such that, the pair of connected communication ports are created at the step S133, and one of the pair is returned to the communication execution unit which made the connection request while the other one of the pair is stored at the step S134.

In this manner, the operations of the communication execution units on the communicating program side and the peer program side at a time of establishing a communication path can be made substantially identical in this configuration of FIG. 11.

Referring now to FIG. 13, a second embodiment of a connection-oriented communication system according to the present invention will be described in detail. This second embodiment concerns with an application of the present invention to a process migration on the operating system UNIX.

As a connection-oriented communication path on the UNIX, there is an interface called socket which provides a communication path using the TCP protocol.

The communication between processes by means of this socket can be carried out along the flow as indicated in FIG. 13.

Namely, the connecting of the socket involves a process called server which accepts the connection and a process called client which requests the connection. First, the socket is created by a system call "socket" on both the server and the client. As a result of this system call "socket", data called file descriptor is obtained as the communication port, and the subsequent access to the socket is carried out with respect to this file descriptor.

On the server side, the created socket is registered in the operating system (OS) by a system call "bind". Also, the server sets up a number of clients that can wait for the connection by using a system call "listen". Then, the server awaits for the request from the client by using a system call "accept".

On the other hand, the client makes the request for the connection of the created socket to the server by using a system call "connect". Here, the connection can be established only when there exists both the "accept" call from the server and the "connect" call from the client, so that the "accept" call on the server side is blocked until the "connect" call on the client side is made.

After the connection is established, the communication can be carried out by using system calls "read" and "write" with respect to the connected sockets. Once the communication path is established, this communication path is maintained until either one of the sockets is closed, so that the subsequent communication can be carried out by using the system calls "read" and "write" with respect to the file descriptors of the sockets.

Referring now to FIG. 14 to FIG. 18, the procedure for the migration of the process which is executing the communication by using the socket according to the present invention will be described in detail.

Figure 14:
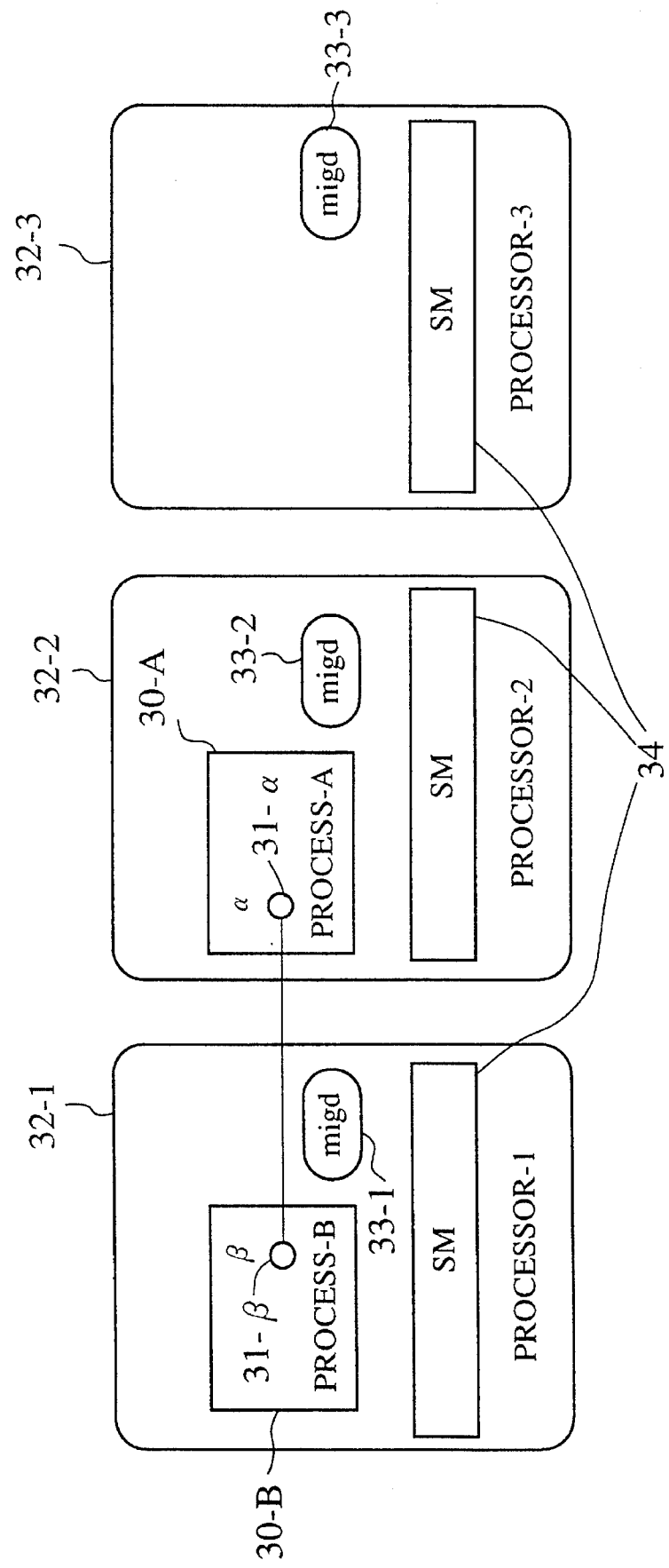

FIG. 14 shows a situation in which a process-A 30-A on a processor-2 32-2 and a process-B 30-B on a processor-1 32-1 have obtained the connected sockets $\alpha$ and $\beta$ 31-$\alpha$ and 31-$\beta$, respectively, from the OS. Here, each process 30 corresponds to the mutually linked and executed user program and communication execution unit in the first embodiment described above. Also, each processor 32 has a migration management server (migd) 33 which has the functions corresponding to the communication path establishing unit in the first embodiment described above as well as the function of the process migration, and a shared memory (SM) 34 which is accessible from the process on that processor 32.

Figure 15:
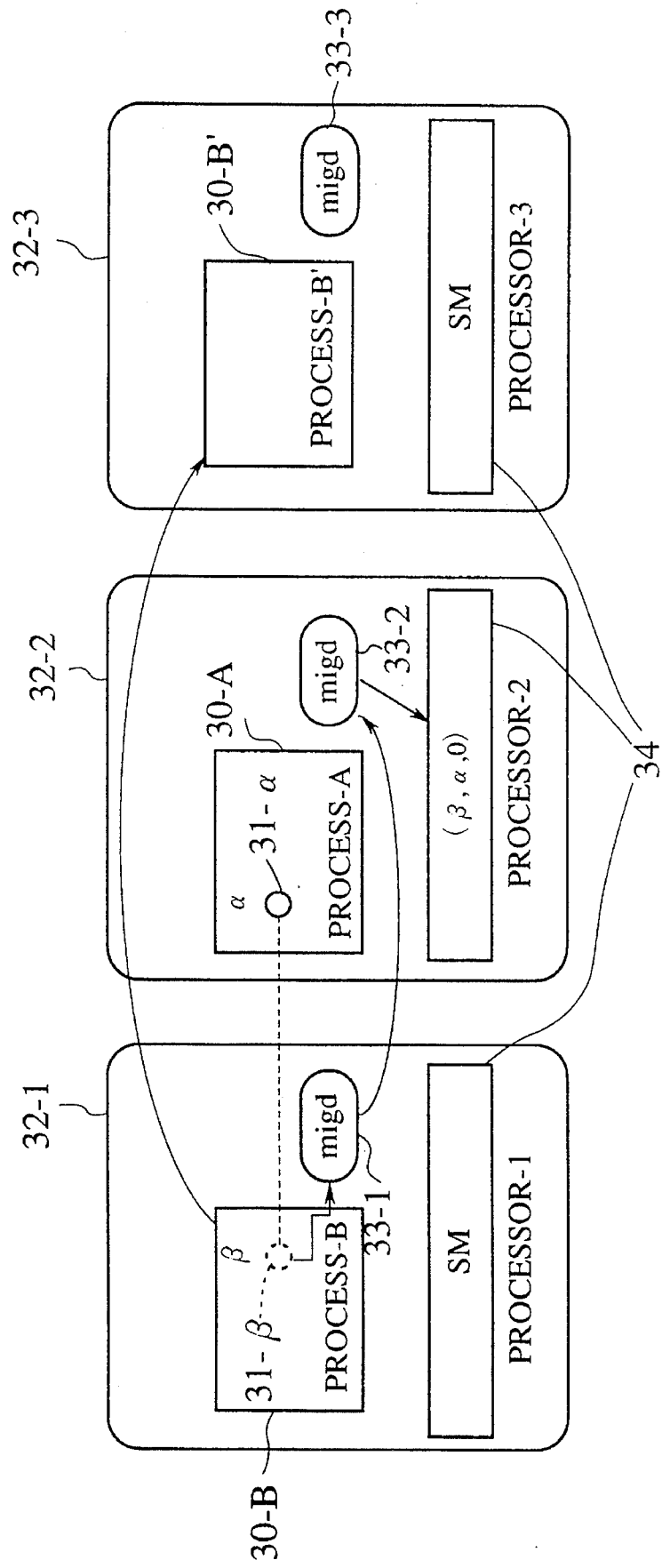

FIG. 15 shows a situation in which the process-B 30-B is migrated from the processor-1 32-1 to a processor-3 32-3, to be a process-B' 30-B', starting from the situation of FIG. 14.

The process-B 30-B notifies the migration management server (migd) 33-1 on the processor-1 32-1 that the socket-$\beta$ 31-$\beta$ is going to be closed, before the migration takes place. Then, this migration management server (migd) 33-1 on the processor-1 32-1 notifies the address of the socket-$\beta$ 31-$\beta$ to be closed to the migration management server (migd) 33-2 on the processor-2 32-2. In response, the migration management server (migd) 33-2 registers the notified address into the shared memory (SM) 34 on the same processor-2 32-2 along with the address of the socket-$\alpha$ 31-$\alpha$ that has been connected with the socket-$\beta$ 31-$\beta$ to be closed as the communication path information ($\beta,\alpha$).

Figure 16:
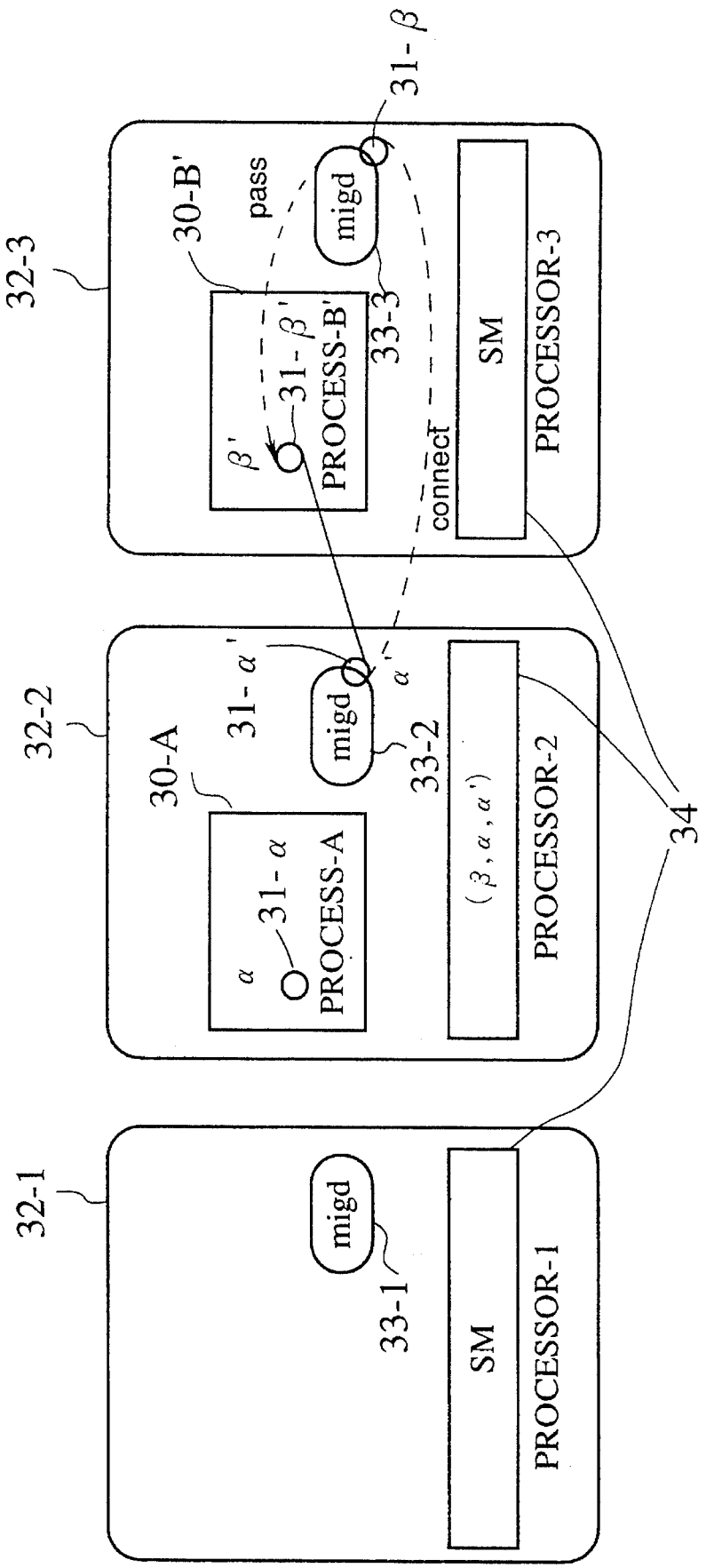

FIG. 16 shows a situation in which an establishment of a new connection between the process-B' 30-B' and the process-A 30-A has began, starting from the situation of FIG. 15. Here, in order to obtain the new connection, the process-B' 30-B' requests the newly connected socket to the migration management server (migd) 33-3 on the processor-3 32-3. In response, the migration management server (migd) 33-3 establishes ("connect") the new connection with the migration management server (migd) 33-2 on the processor-2 32-2, and passes ($\mp$pass") the obtained new socket-$\beta$'

31-β' to the process-B' 30-B'. On the other hand, the migration management server (migd) 33-2 on the processor-2 32-2 registers the obtained new socket-α' 31-' into the shared memory (SM) 34 on the same processor-2 32-2 in correspondence to the already registered communication path information (β, α).

Figure 17:
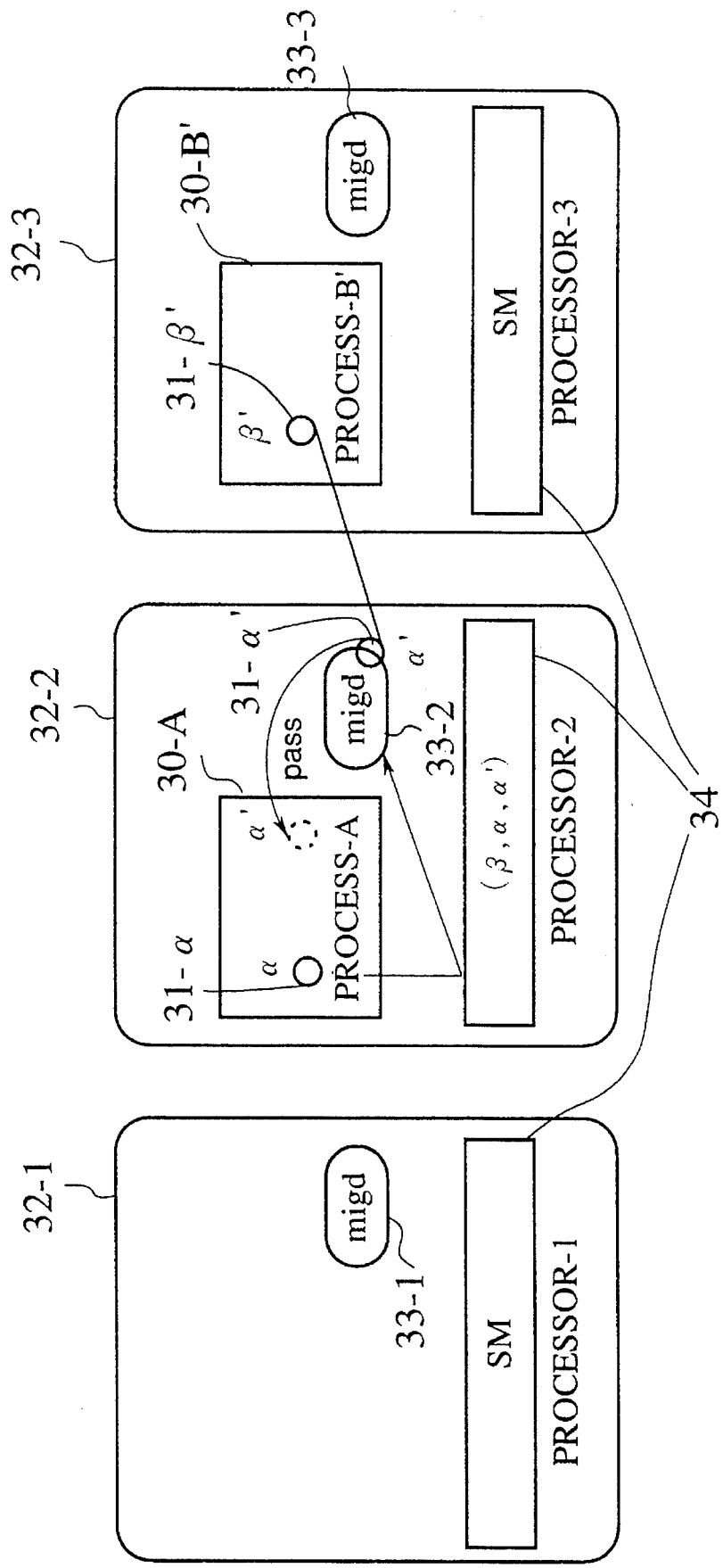

FIG. 17 shows a situation in which the process-A 30-A executes the communication with the process-B, starting from the situation of FIG. 16. Here, the migration management server (migd) 33-2 on the processor 32-2 checks the shared memory (SM) 34 on that processor 32-2 first. When the communication path information (β, α) for this communication is registered in the shared memory (SM) 34 along with the new socket-α' 31-α', the migration management server (migd) 33-2 passes the new socket-α' 31-α' to the process-A 30-A.

Figure 18:
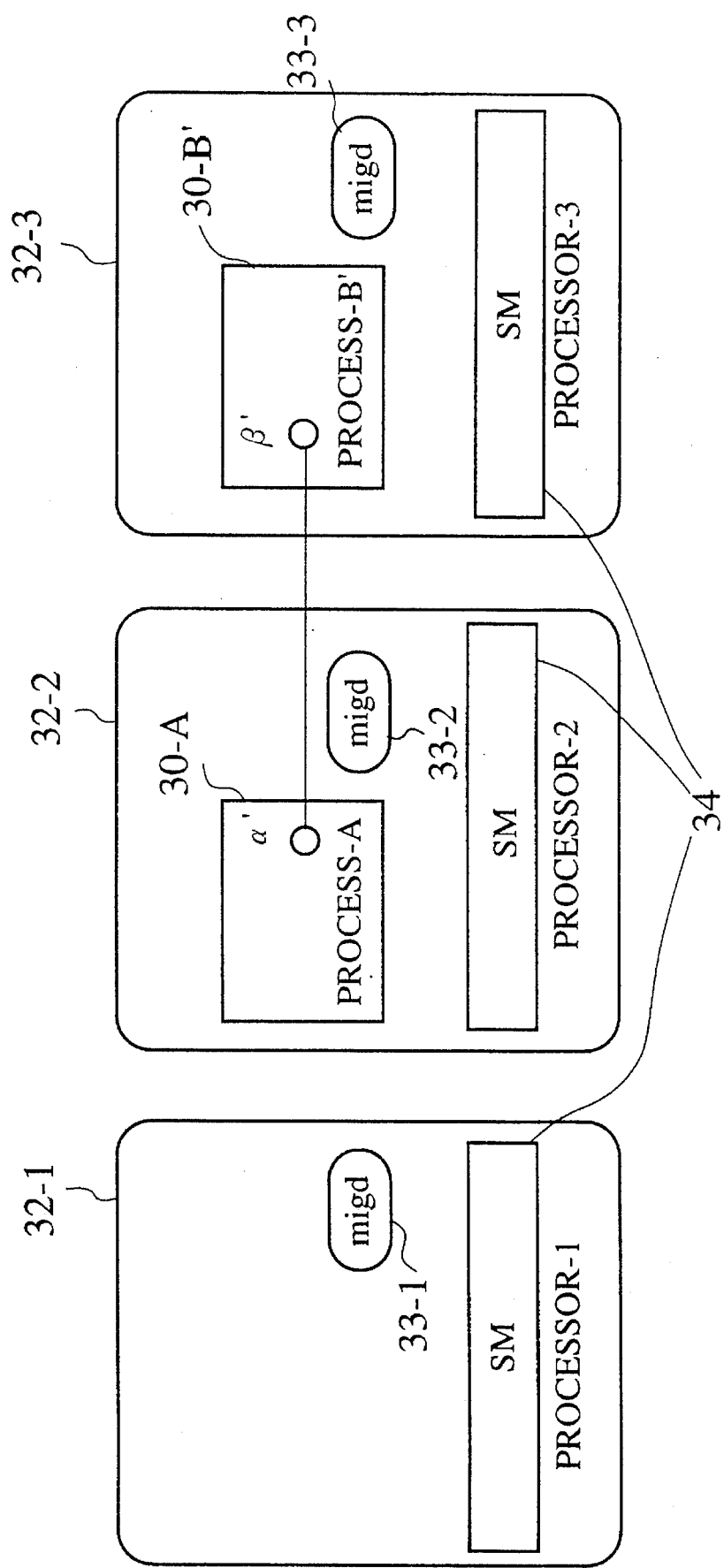

FIG. 18 shows a situation in which the new connection between the process-B' 30-B' and the process-A 30-A has established, starting from the situation of FIG. 17, in which the new connection is established by the new sockets α' and β' 31-α' and 31-β'.

In this manner, it is possible in this second embodiment to realize a connection-oriented communication system using the UNIX in which the process migration can be achieved for the communicating process, without requiring the mutually communicating processes to be aware of the occurrences of the process migration.

It is to be noted that many modifications and variations of the above embodiments may be made without departing from the novel and advantageous features of the present invention. Accordingly, all such modifications and variations are intended to be included within the scope of the appended claims.

What is claimed is:

1. A connection-oriented communication system, comprising:

communication means for providing connection-oriented communication paths; and first communication execution means for making a connection request for requesting a communication port of a connected communication path for replacing a currently used communication path in the communication means;

communication path establishing means for creating the connected communication path and returning one communication port of the connected communication path to the first communication execution means, in response to the connection request made by the first communication execution means; and second communication execution means for receiving another communication port of the connected communication path from the communication path establishing means, such that mutually communicating programs connected with the first and second communication execution means continue to communicate through said one and another communication ports of the connected communication path replacing the currently used communication path.

2. The system of claim 1, wherein the communication path establishing means includes first and second communication path establishing units between which the connected communication path is created, where the first communication path establishing unit returns said one communication port of the connected communication path to the first communication execution means while the second communication path unit gives said another communication port of the connected communication path to the second communication execution means.

3. The system of claim 1, wherein the second communication execution means receives said another communication port by making a communication port request for said another communication port to the communication path establishing means, such that the communication path establishing means returns said another communication port of the connected communication path to the second communication execution means in response to the communication port request made by the second communication execution means.

4. The system of claim 1, wherein the communication path establishing means also notifies a creation notice for a creation of the connected communication path to the second communication execution means after creating the connected communication path, and the second communication execution means receives said another communication port by making a communication port request for said another communication port to the communication path establishing means in response to the creation notice from the communication path establishing means, such that the communication path establishing means returns said another communication port of the connected communication path to the second communication execution means in response to the communication port request made by the second communication execution means.

5. The system of claim 1, wherein the first communication execution means also notifies a closing notice for closing of a currently used communication port to the communication path establishing means before making the connection request, the communication path establishing means notifies the closing notice to the second communication execution means in response to the closing notice from the first communication execution means before creating the connected communication path, and the second communication execution means received the closing notice from the communication path establishing means before receiving said another communication port.

6. The system of claim 5, wherein the communication path establishing means includes first and second communication path establishing units between which the connected communication path is created in response to the connection request made by the first communication execution means, where the first communication path establishing unit notifies the closing notice to the second communication path establishing unit in response to the closing notice from the first communication execution means and returns said one communication port of the connected communication path to the first communication execution means, while the second communication path establishing unit notifies the closing notice to the second communication execution means in response to the closing notice from the first communication path establishing unit and gives said another communication port of the connected communication path to the second communication execution means.

7. The system of claim 5, further comprising:

registration means for registering a communication path information for a closed communication path entered from the communication path establishing means in response to the closing request made by the first communication execution means, in correspondence to said another communication port on the connected communication path entered from the communication path establishing means in response to the creation of the connected communication path, such that the second communication execution means receives said another communication port of the connected communication path from the registration means through the communication path establishing means.

8. The system of claim 7, wherein the first communication execution means postpones an execution of a program requiring a communication with the second communication execution means through said one communication port of the connected communication path until said another communication port is registered in the registration means in correspondence to the communication path information.

9. The system of claim 5, wherein each of the first and second communication execution means includes message storing unit for temporarily storing unread messages left in the communication means at a time of closing of a communication port and receiving of a communication port of the connected communication path.

10. The system of claim 9, wherein each of the first and second communication execution means reads out the unread messages stored in the message storing unit when a communication for reading is executed.

11. The system of claim 1, further comprising:

original communication execution means for notifying a closing notice for closing of a currently used communication port to the communication path establishing means and transferring a communication path information for a currently used communication path to the first communication execution means, such that the first communication execution means makes the connection request in response to the communication path information received from the original communication execution means, the communication path establishing means notifies the closing notice to the second communication execution means in response to the closing notice notified from the original communication execution means before creating the connected communication path, and the second communication execution means receives the closing notice from the communication path establishing means before receiving said another communication port.

12. The system of claim 11, wherein the communication path establishing means includes original, first, and second communication path establishing units, where the original communication path establishing unit notifies the closing notice to the second communication path establishing unit in response to the closing notice from the original communication execution means, the connected communication path is created between the first and second communication path establishing units in response to the connection request made by the first communication execution means, and the first communication path establishing unit returns said one communication port of the connected communication path to the first communication execution means, while the second communication path establishing unit notifies the closing notice to the second communication execution means in response to the closing notice from the original communication path establishing unit and gives said another communication port of the connected communication path to the second communication execution means.

13. The system of claim 11, wherein a transfer of the communication path information from the original communication execution means to the first communication execution means defines a process migration.

14. A method of connection-oriented communication, comprising the steps of:

(a) making a connection request for requesting a communication port of a connected communication path for replacing a currently used communication path from a first communication execution means;

(b) creating the connected communication path and returning on communication portion of the connected communication path to the first communication execution means, at a communication path establishing means, in response to the connection request made by the first communication execution means;

(c) receiving another communication port of the connected communication path from the communication path establishing means at a second communication execution means; and (d) continuing a communication between mutually communication programs connected with the first and second communication execution means through said one and another communication ports of the connected communication path replacing the currently used communication path.

15. The method of claim 14, wherein at the step (b), the communication path establishing means includes first and second communication path establishing units between which the connected communication path is created, where the first communication path establishing unit returns said one communication port of the connected communication path to the first communication execution means while the second communication path unit gives said another communication port of the connected communication path to the second communication execution means.

16. The method of claim 14, further comprising the steps of:

(e) notifying a closing notice for closing of a currently used communication port to the communication path establishing means from the first communication execution means, before making the connection request at the step (a);

(f) notifying the closing notice to the second communication execution means from the communication path establishing means in response to the closing notice from the first communication execution means, before creating the connected communication path at the step (b); and (g) receiving the closing notice from the communication path establishing means at the second communication execution means, before receiving said another communication port at the step (c).

17. The method of claim 16, wherein at the step (b), the communication path establishing means includes first and second communication path establishing units between which the connected communication path is created in response to the connection request made by the first communication execution means, and wherein the first communication path establishing unit notifies the closing notice to the second communication path establishing unit at the step (f) in response to the closing notice from the first communication execution means and returns said one communication port of the connected communication path to the first communication execution means at the step (b), while the second communication path establishing unit notifies the closing notice to the second communication execution means in response to the closing notice from the first communication path establishing unit at the step (f) and gives said another communication port of the connected communication path to the second communication execution means at the step (b).

18. The method of claim 14, further comprising the steps of:

(h) notifying a closing notice for closing of a currently used communication port to the communication path establishing means and transferring a communication path information for a currently used communication path to the first communication execution means, from an original communication execution means, such that the first communication execution means makes the connection request at the step (a) in response to the communication path information received from the original communication execution means, (i) notifying the closing notice to the second communication execution means from the communication path establishing means in response to the closing notice from the original communication execution means, before creating the connected communication path at the step (b); and (j) receiving the closing notice from the communication path establishing means at the second communication execution means, before receiving said another communication port at the step (c).

19. The method of claim 18, wherein at the steps (b) and (i), the communication path establishing means includes original, first, and second communication path establishing units, where the original communication path establishing unit notifies the closing notice to the second communication path establishing unit in response to the closing notice from the original communication execution means at the step (i), the connected communication path in created between the first and second communication path establishing units in response to the connection request made by the first communication execution means at the step (b), and the first communication path establishing unit returns said one communication port of the connected communication path to the first communication execution means at the step (b), while the second communication path establishing unit notifies the closing notice to the second communication execution means in response to the closing notice from the original communication path establishing unit at the step (i) and gives said another communication port of the connected communication path to the second communication execution means at the step (b).

* * * * *